United States Patent
Cook

(10) Patent No.: US 12,072,213 B2
(45) Date of Patent: Aug. 27, 2024

(54) INDUCTIVE POSITION ENCODER UTILIZING SLANTED SCALE PATTERN

(71) Applicant: Mitutoyo Corporation, Kanagawa-ken (JP)

(72) Inventor: Ted Staton Cook, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 52 days.

(21) Appl. No.: 17/900,635

(22) Filed: Aug. 31, 2022

(65) Prior Publication Data
US 2024/0068842 A1 Feb. 29, 2024

(51) Int. Cl.
| | |
|---|---|
| G01D 5/20 | (2006.01) |
| G01B 7/00 | (2006.01) |
| G01D 5/249 | (2006.01) |

(52) U.S. Cl.
CPC ........... G01D 5/2053 (2013.01); G01B 7/003 (2013.01); G01D 5/2497 (2013.01)

(58) Field of Classification Search
CPC ..... G01D 5/2053; G01D 5/2497; G01B 7/003
See application file for complete search history.

(56) References Cited

U.S. PATENT DOCUMENTS

| | | |
|---|---|---|
| 5,104,225 A | 4/1992 | Masreliez |
| 5,576,537 A | 11/1996 | Holzapfel et al. |
| 5,841,274 A | 11/1998 | Masreliez et al. |
| 5,886,519 A | 3/1999 | Masreliez et al. |
| 5,894,678 A | 4/1999 | Masreliez et al. |
| 5,901,458 A | 5/1999 | Andermo et al. |
| 5,936,399 A | 8/1999 | Andermo et al. |
| 5,973,494 A | 10/1999 | Masreliez et al. |

(Continued)

FOREIGN PATENT DOCUMENTS

| | | |
|---|---|---|
| CN | 1272620 A | 11/2000 |
| CN | 1441226 A | 9/2003 |

(Continued)

OTHER PUBLICATIONS

Cook, "Transmitter and Receiver Configuration for Inductive Position Encoder," U.S. Appl. No. 16/826,842, filed Mar. 23, 2020, 77 pages.

*Primary Examiner* — Eman A Alkafawi
*Assistant Examiner* — Suresh K Rajaputra
(74) *Attorney, Agent, or Firm* — Seed IP Law Group LLP

(57) ABSTRACT

An inductive type position encoder includes a scale, a detector portion and a signal processor. According to one aspect, field generating elements and sensing elements of the detector portion are provided on opposite sides of the scale such that at least part of the scale is between the field generating elements and the sensing elements (transmissive configuration). According to another aspect, the scale comprises a periodic scale pattern including signal modulating elements that are disposed along a scale direction, which is not parallel to a measuring axis direction of the encoder and is slanted at a scale angle relative to the measuring axis direction, such that there is a corresponding y-direction displacement for a given x-direction displacement of the encoder. These aspects of the disclosure make it possible to design a very compact inductive type position encoder, including one capable of indicating an absolute position along the scale.

20 Claims, 19 Drawing Sheets

(56) References Cited

U.S. PATENT DOCUMENTS

| | | |
|---|---|---|
| 5,998,990 A | 12/1999 | Andermo et al. |
| 6,002,250 A | 12/1999 | Masreliez et al. |
| 6,011,389 A | 1/2000 | Masreliez et al. |
| 6,049,204 A | 4/2000 | Andermo et al. |
| 6,054,851 A | 4/2000 | Masreliez et al. |
| 6,124,708 A | 9/2000 | Dames |
| 6,157,188 A | 12/2000 | Steinke |
| 6,259,249 B1 | 7/2001 | Miyata |
| 6,271,661 B2 | 8/2001 | Andermo et al. |
| 6,329,813 B1 | 12/2001 | Andermo |
| RE37,490 E | 1/2002 | Andermo et al. |
| 6,335,618 B1 | 1/2002 | Nahum |
| 6,400,138 B1 | 6/2002 | Andermo |
| 6,522,128 B1 | 2/2003 | Ely et al. |
| 6,522,129 B2 | 2/2003 | Miyata et al. |
| 6,531,866 B2 | 3/2003 | Miyata et al. |
| 6,545,461 B1* | 4/2003 | Miyata ............... G01D 5/2053 324/207.17 |
| 6,573,707 B2 | 6/2003 | Kiriyama et al. |
| 6,628,115 B2 | 9/2003 | Sasaki et al. |
| 6,646,433 B2 | 11/2003 | Milvich |
| 6,646,434 B2 | 11/2003 | Miyata et al. |
| 6,664,535 B1 | 12/2003 | Nahum et al. |
| 6,714,004 B2 | 3/2004 | Jagiella |
| 6,720,760 B2 | 4/2004 | Milvich |
| 6,781,694 B2 | 8/2004 | Nahum et al. |
| 6,867,412 B2 | 3/2005 | Patzwald et al. |
| 7,015,687 B2 | 3/2006 | Meyer |
| 7,126,495 B2 | 10/2006 | Netzer |
| 7,196,510 B2 | 3/2007 | Kawatoko |
| 7,239,130 B1 | 7/2007 | Milvich |
| 7,307,736 B2 | 12/2007 | Tobiason et al. |
| 7,530,177 B1 | 5/2009 | Meichle et al. |
| 7,608,813 B1 | 10/2009 | Milvich et al. |
| 7,652,469 B2 | 1/2010 | Meyer |
| 7,705,585 B2 | 4/2010 | Howard |
| 7,906,958 B2 | 3/2011 | Nakayama et al. |
| 8,094,323 B2 | 1/2012 | Kapner |
| 8,222,891 B2 | 7/2012 | Steinke et al. |
| 8,309,906 B2 | 11/2012 | Kapner et al. |
| 8,847,583 B2 | 9/2014 | Sasaki et al. |
| 8,928,311 B2 | 1/2015 | Sasaki |
| 9,018,578 B2 | 4/2015 | Tobiason et al. |
| 9,228,823 B2 | 1/2016 | Fontanet et al. |
| 9,267,819 B2 | 2/2016 | Cook |
| 9,383,184 B2 | 7/2016 | Tiemann et al. |
| 9,435,663 B2 | 9/2016 | Cook |
| D774,928 S | 12/2016 | Matsumiya et al. |
| 9,612,136 B1 | 4/2017 | Cook |
| 9,618,366 B2 | 4/2017 | Nahum |
| 9,678,701 B2 | 6/2017 | Cook |
| 9,772,202 B1 | 9/2017 | Cook |
| 9,778,072 B1 | 10/2017 | Nahum |
| 9,833,802 B2 | 12/2017 | Kalistaja et al. |
| 9,835,473 B2 | 12/2017 | Nahum |
| 9,958,294 B2 | 5/2018 | Cook |
| 10,302,466 B2 | 5/2019 | Tobiason et al. |
| 10,422,666 B2 | 9/2019 | Cook |
| 10,520,335 B2 | 12/2019 | Cook |
| 10,551,217 B2 | 2/2020 | Cook |
| 10,591,316 B2 | 3/2020 | Cook |
| 10,612,943 B2 | 4/2020 | Cook |
| 10,775,199 B2 | 9/2020 | Cook |
| 11,067,414 B1 | 7/2021 | Cook |
| 2001/0003422 A1 | 6/2001 | Andermo et al. |
| 2001/0020846 A1 | 9/2001 | Miyata |
| 2002/0030484 A1 | 3/2002 | Kiriyama et al. |
| 2002/0030485 A1 | 3/2002 | Gleixner |
| 2003/0090264 A1 | 5/2003 | Milvich |
| 2003/0128028 A1 | 7/2003 | Jordil |
| 2003/0160608 A1 | 8/2003 | Milvich |
| 2006/0103376 A1 | 5/2006 | Ma |
| 2009/0119940 A1 | 5/2009 | Meichle et al. |
| 2011/0254541 A1 | 10/2011 | Sasaki |
| 2012/0007591 A1 | 1/2012 | Howard et al. |
| 2014/0184202 A1 | 7/2014 | Horiguchi et al. |
| 2015/0375246 A1 | 12/2015 | Kalistaja et al. |
| 2016/0054154 A1 | 2/2016 | Cook |
| 2016/0146636 A1 | 5/2016 | Nahum |
| 2017/0089738 A1 | 3/2017 | Cook |
| 2017/0268905 A1 | 9/2017 | Nahum |
| 2017/0268906 A1 | 9/2017 | Nahum |
| 2018/0003524 A1 | 1/2018 | Cook |
| 2018/0058883 A1 | 3/2018 | Cook |
| 2018/0087928 A1 | 3/2018 | Jones |
| 2018/0113004 A1 | 4/2018 | Cook |
| 2018/0180452 A1 | 6/2018 | Cook |
| 2018/0195880 A1 | 7/2018 | Cook |
| 2019/0120660 A1 | 4/2019 | Hitchman et al. |
| 2019/0301895 A1 | 10/2019 | Cook |
| 2020/0003581 A1 | 1/2020 | Cook et al. |
| 2020/0003583 A1* | 1/2020 | Cook .................. G01D 5/2046 |
| 2021/0293581 A1* | 9/2021 | Cook .................. G01D 5/2448 |

FOREIGN PATENT DOCUMENTS

| | | |
|---|---|---|
| CN | 105415882 A | 3/2016 |
| EP | 1014041 A1 | 6/2000 |
| JP | 2018004628 A | 1/2018 |
| JP | 2018031777 A | 3/2018 |
| JP | 2018105854 A | 7/2018 |

\* cited by examiner

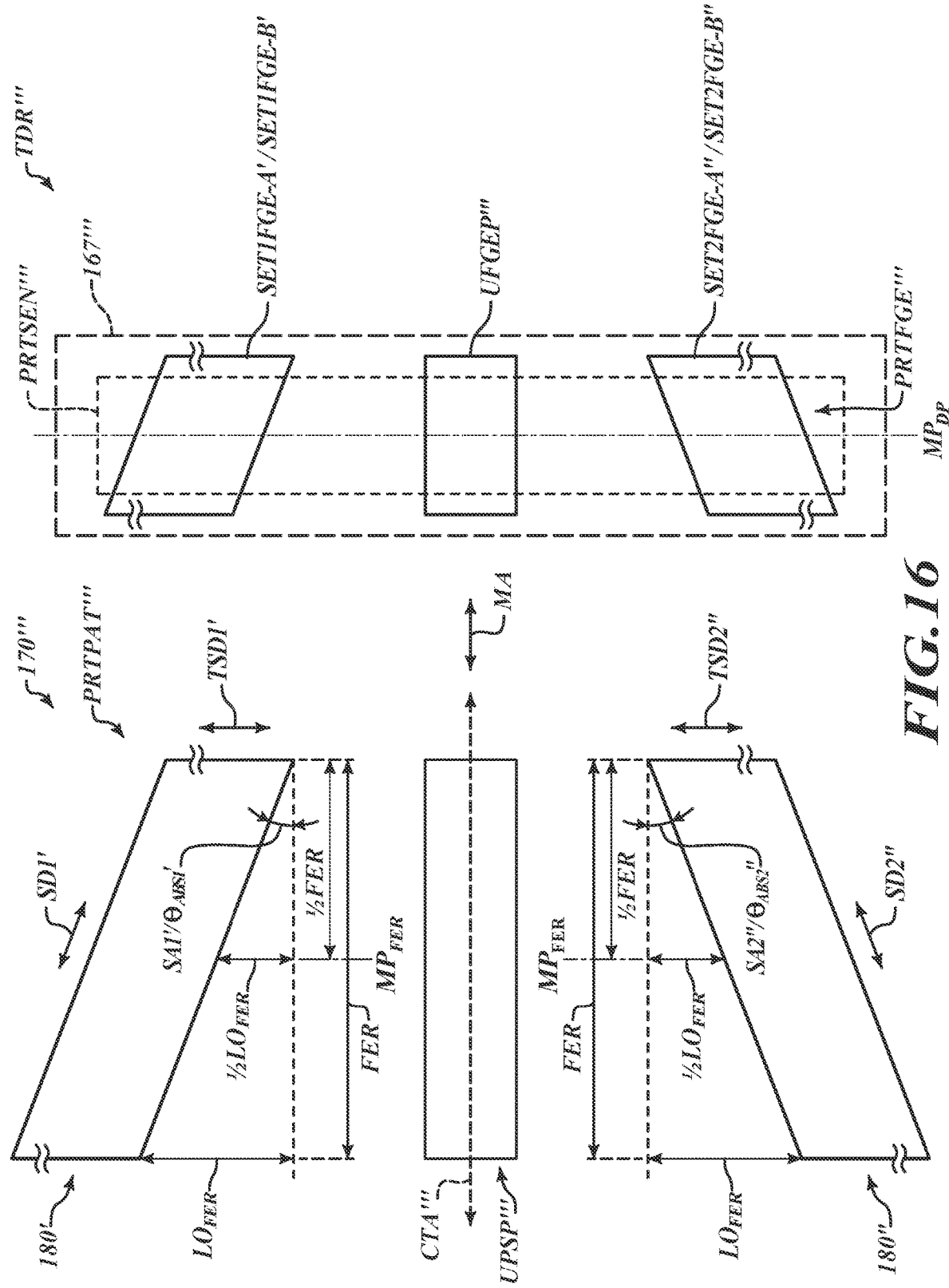

1700

1710 Provide drive signals to cause a first set of field generating elements to generate a changing magnetic flux, wherein the first set of field generating elements and a first set of sensing elements are part of a detector portion and are on opposite sides of a first periodic scale pattern along a direction perpendicular to a measuring axis direction, for which at least part of the first periodic scale pattern is between the first set of field generating elements and the first set of sensing elements 1720 Receive detector signals from the first set of sensing elements, wherein the detector signals respond to a local effect on a changing magnetic flux provided by adjacent signal modulating elements of the first periodic scale pattern 1730 Determine a relative position between the detector portion and the first periodic scale pattern based at least in part on detector signals from the detector portion

*FIG. 17*

INDUCTIVE POSITION ENCODER UTILIZING SLANTED SCALE PATTERN

BACKGROUND

Technical Field

This disclosure relates to metrology and, more particularly, to inductive position encoders that may be utilized in precision metrology systems.

Description of the Related Art

Various encoder configurations may include various types of optical, capacitive, magnetic, inductive, movement and/or position transducers. These transducers use various geometric configurations of a transmitter and a receiver in a read head to measure movement between the read head and a scale.

U.S. Pat. No. 6,011,389 (the '389 patent) and U.S. Pat. No. 6,124,708 (the '708 patent) describe induced current position transducers usable in high accuracy applications; U.S. Pat. No. 5,973,494 (the '494 patent) and U.S. Pat. No. 6,002,250 (the '250 patent) describe incremental position inductive calipers and linear scales, including signal generating and processing circuits; and U.S. Pat. No. 5,886,519 (the '519 patent), U.S. Pat. No. 5,841,274 (the '274 patent), and U.S. Pat. No. 5,894,678 (the '678 patent) describe absolute position inductive calipers and electronic tape measures using an induced current transducer. U.S. Pat. No. 10,520,335 (the '335 patent), U.S. Pat. No. 10,612,943 (the '943 patent) and U.S. Pat. No. 10,775,199 (the '199 patent) disclose winding configuration refinements that are useful for enhancing the accuracy, robustness, and ease of alignment of inductive position encoders. All of the foregoing are hereby incorporated herein by reference in their entireties. As described in these patents, an induced current transducer may be manufactured using printed circuit board technology and is largely immune to contamination. However, such systems may be limited in their ability to provide certain combinations of features desired by users, such as combinations of compact size, high resolution, accuracy, low cost, robustness to contamination, etc. Configurations of encoders that provide improved combinations of such features would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An electronic position encoder is provided, which is configured to measure a relative position between a detector portion and a scale along a measuring axis direction. The electronic position encoder includes:

- a scale extending along the measuring axis direction, wherein the scale includes a first periodic scale pattern including signal modulating elements comprising similar conductive plates or similar conductive loops that are disposed along a first scale direction and a first transverse scale direction;
- a detector portion configured to be mounted proximate to the first periodic scale pattern and to move relative to the first periodic scale pattern along the measuring axis direction (e.g., over a full encoder range), wherein the detector portion includes:
  - a first set of field generating elements arranged along the first transverse scale direction, wherein members of the first set of field generating elements comprise conductive loops or conductive loop portions and are configured to generate a changing magnetic flux in response to a drive signal; and
  - a first set of sensing elements arranged along the measuring axis direction, wherein members of the first set of sensing elements comprise conductive loops or conductive loop portions, and the first set of sensing elements are configured to provide detector signals which respond to a local effect on a changing magnetic flux provided by adjacent signal modulating elements of the first periodic scale pattern; and
- a signal processing configuration that is operably connected to the detector portion to provide the drive signals and that is configured to determine a relative position between the detector portion and the first periodic scale pattern based on detector signals input from the detector portion.

In various implementations, the electronic encoder may be implemented according to a transmissive configuration and/or utilizing a slanted scale pattern.

In an implementation utilizing a transmissive configuration, the first set of field generating elements and the first set of sensing elements are on opposite sides of the first periodic scale pattern along a direction perpendicular to the measuring axis direction, for which at least part of the first periodic scale pattern is between the first set of field generating elements and the first set of sensing elements.

In an implementation utilizing a slanted scale pattern:
- the first scale direction is not parallel to the measuring axis direction and is slanted at a first scale angle relative to the measuring axis direction;
- an effective lateral offset of the signal modulating elements of the first periodic scale pattern varies depending on position along the measuring axis direction in accordance with the first scale angle; and
- the detector signals that are input from the detector portion vary based at least in part on the effective lateral offset of signal modulating elements that are proximate to the detector portion as the relative position between the detector portion and the first periodic scale pattern is changed along the measuring axis direction (e.g., for which in various implementations this enables the determination of an absolute position of the detector portion relative to the scale based on processing the corresponding detector signals from the detector portion).

BRIEF DESCRIPTION OF THE DRAWINGS

FIG. 16 is a diagram illustrating a third implementation of a transducer including a scale and a detector portion such as may be utilized in the position encoder of FIG. 1.

FIG. 17 is a flow diagram illustrating a method for operating a position encoder with field generating elements and sensing elements on opposite sides of a scale.

DETAILED DESCRIPTION

Figure 1:
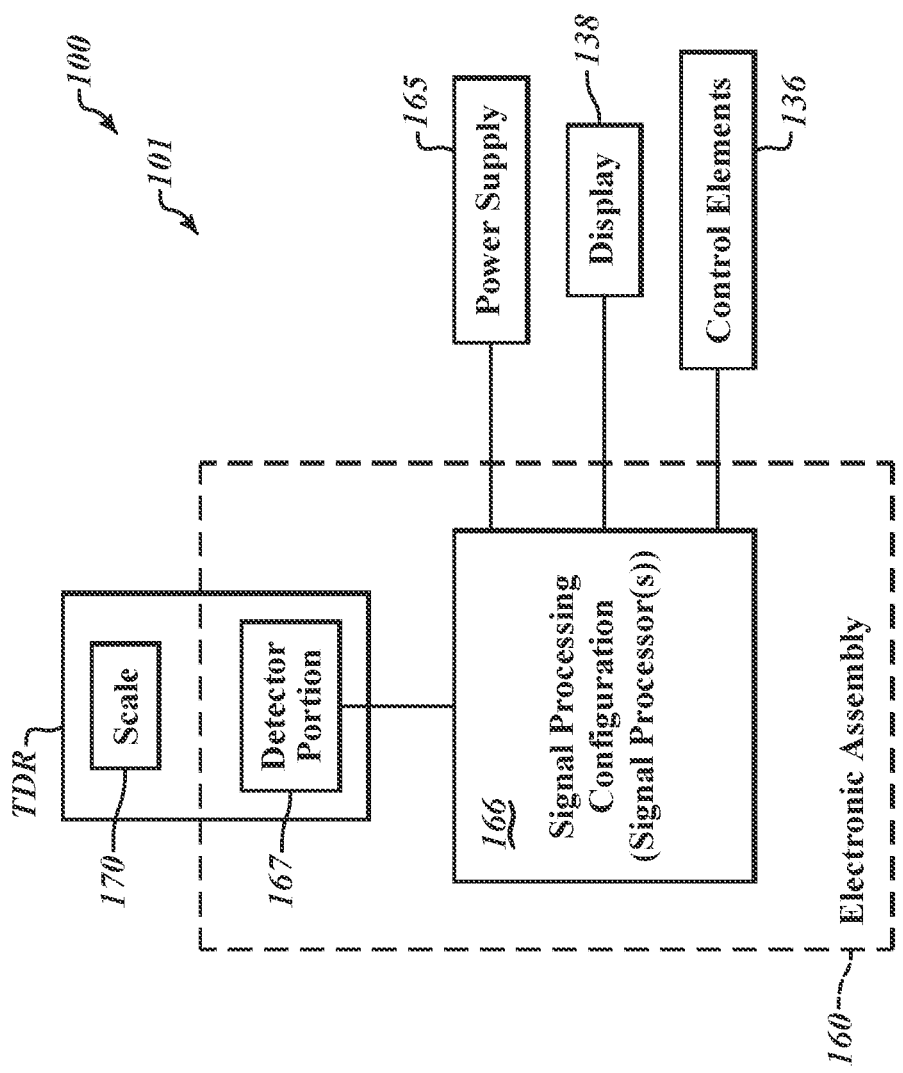
FIG. 1 is a diagram of an inductive electronic position encoder including a transducer with a detector portion and a scale.

FIG. 1 is a block diagram of exemplary components of a metrology system 100 including an electronic absolute position encoder 101. In various implementations, the electronic absolute position encoder 101 includes a scale 170 and a detector portion 167, which together form a transducer TDR. The electronic absolute position encoder 101 includes suitable user interface features such as a display 138 and/or user-operable control elements 136 (e.g., switches, buttons, etc.) In some implementations, the electronic absolute position encoder 101 may be used as part of a wireless-only device or other configuration, without the encoder 101 including a display (e.g., such as the system 100 including a corresponding remote display, such as part of a phone or tablet, or similar via Bluetooth or other connection, etc.) The encoder 101 may additionally include a power supply 165. All of these elements of the encoder 101 are coupled to a signal processing configuration 166 (e.g., including one or more signal processors), which in various implementations may be embodied as a signal processing and display electronic circuit in integrated circuit (IC) chip(s). The signal processing configuration 166 receives detector signals from the detector portion 167 and processes the detector signals to determine an absolute position of the detector portion 167 along the scale 170. It will be appreciated that the signal processing configuration 166 may comprise any combination of signal processing and physical circuitry. In various implementations, the signal processing configuration 166 and the detector portion 167 may be included as part of an electronic assembly 160 (e.g., as arranged on a substrate, etc.)

Figure 19:
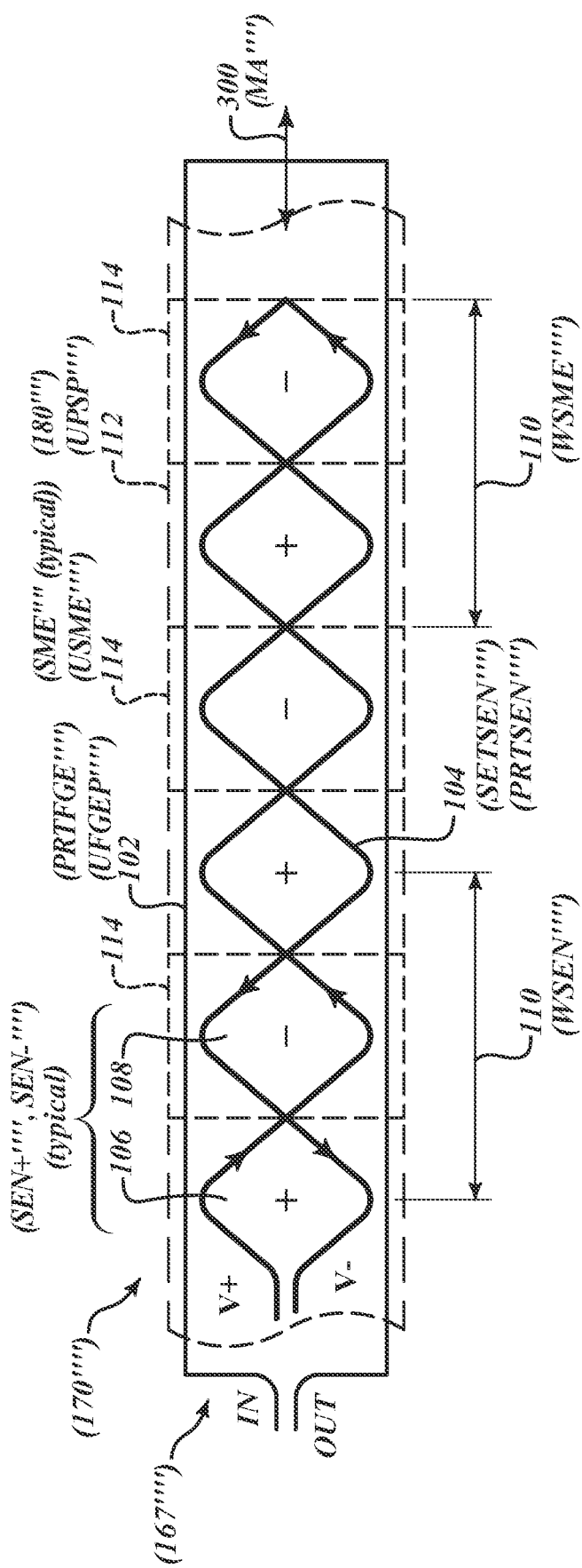
FIG. 19 is a plan view diagram schematically illustrating certain features of a representative prior art inductive electronic position encoder, presented as background information that is relevant to various principles disclosed herein.

FIG. 19 is a plan view diagram schematically illustrating certain features of a representative prior art inductive electronic position encoder shown in the previously incorporated '389 patent, presented as background information that is relevant to various principles disclosed elsewhere herein. FIG. 19 furthermore includes reference numeral annotations to show the comparable reference numerals or symbols used to designate comparable elements in other figures included herein. In the following abbreviated description, which is based on the disclosure of the '389 patent, some of the comparable reference numbers in other figures of the present disclosure are shown in parentheses following the original reference numerals from the '389 patent. A full description related to the prior art FIG. 19 may be found in the '389 patent. Therefore, only an abbreviated description (e.g., including certain teachings from the '389 patent that are relevant to the present disclosure) is included here.

As disclosed in the '389 patent, a transducer such as that shown in FIG. 19 includes at least two substantially coplanar paths of wire or windings. A transmitter winding 102 (PRTFGE"") forms a large planar loop. In this example, the transmitter winding 102 forms an entire field generating portion PRTFGE"", and may in some implementations be referenced as an unslanted field generating element portion UFGEP"" (e.g., in contrast to certain slanted field generating element portions of the present invention as will be described in more detail below). A receiver winding 104 (PRTSEN"", SETSEN""), in substantially the same plane as the transmitter winding 102, is laid out in one direction as indicated by the arrows in a zig-zag or sinusoidal pattern and then in a reverse direction as indicated by the arrows so that the winding crosses over itself to form alternating loops 106 (SEN+"") and 108 (SEN−"") interposed between each other, as shown. As a result, each of the alternating loops 106 (SEN+"") and 108 (SEN−"") of the receiver winding 104 (PRTSEN"", SETSEN"") have a different winding direction as compared to adjacent loops. By applying an alternating (changing) current to the transmitter winding 102 (PRTFGE""), the transmitter winding produces a time-varying magnetic field, extending through the loops 106 (SEN+"") and 108 (SEN−"") of the receiver winding 104 (PRTSEN"", SETSEN""). In various implementations, the loops 106 (SEN+"") and 108 (SEN−"") may be designated as a set of sensing elements (SETSEN"") of a sensing portion (PRTSEN"").

If a scale (170"") or scale pattern 112 (180"") (a segment of which is outlined by edges indicating alternating long-dash lines and short-dash lines in FIG. 19), including a conductive object (e.g., a conductive plate 114 (SME""), several of which are outlined using short-dash lines on the scale pattern 112 in FIG. 19), is moved close to the detector portion (167""), the varying magnetic field generated by the transmitter winding 102 (PRTFGE"") will induce eddy currents in the conductive object, which in turn sets up a magnetic field from the object that counteracts the varying transmitter magnetic field. As a result, the magnetic flux that the receiver winding 104 (PRTSEN"") receives is altered or disrupted, thereby causing the receiver winding to output a non-zero EMF signal (a voltage) at the output terminals V+ and V− of the receiver winding 104, which will change polarity as the conductive object moves between the "+" and "−" loops 106 (SEN+"") and 108 (SEN−""). In some implementations, the signal modulating elements (SME"") may be referenced as unslanted signal modulating elements (USME""), and the periodic scale pattern (180"") may be referenced as an unslanted periodic scale pattern (UPSP"").

The distance between the location of two loops of the same polarity, (e.g., between the location of a loop 106 (SEN+"") to the location of the next loop 106 (SEN+"")) is defined as a pitch or wavelength 110 (WSEN"") of the set of sensing elements (SETSEN""), and may be equal to a pitch or wavelength 110 (WSME"") of the scale pattern (180"") and scale (170""). It may be seen that each loop 106 (SEN+"") and/or 108 (SEN−"") therefore has a length or maximum dimension 0.5*(WSEN"") along the measuring axis direction (MA""). If the conductive object described above (e.g., a conductive plate 114 (SME"")) is proximate to the receiver winding 104 (PRTSEN"") and is continuously varied in position along a measuring axis 300 (MA""), the AC amplitude of the signal output from the receiver winding (PRTSEN"") will vary continuously and periodically with the wavelength 110 (WSME"") due to the periodic alteration of the loops 106 (SEN+"") and 108 (SEN−"") and local disruption of the transmitted magnetic field caused by the conductive object (e.g., a conductive plate 114 (SME"")).

It will be appreciated that the transmitter winding 102 (PRTFGE"") and the receiver winding 104 (PRTSEN"") shown in FIG. 19 and described above are one example of a prior art implementation of elements that are designated as a detector portion (167""). The scale (170"") or scale pattern 112 (180"") is one example of a prior art implementation that is designated as a scale pattern.

Figure 2:
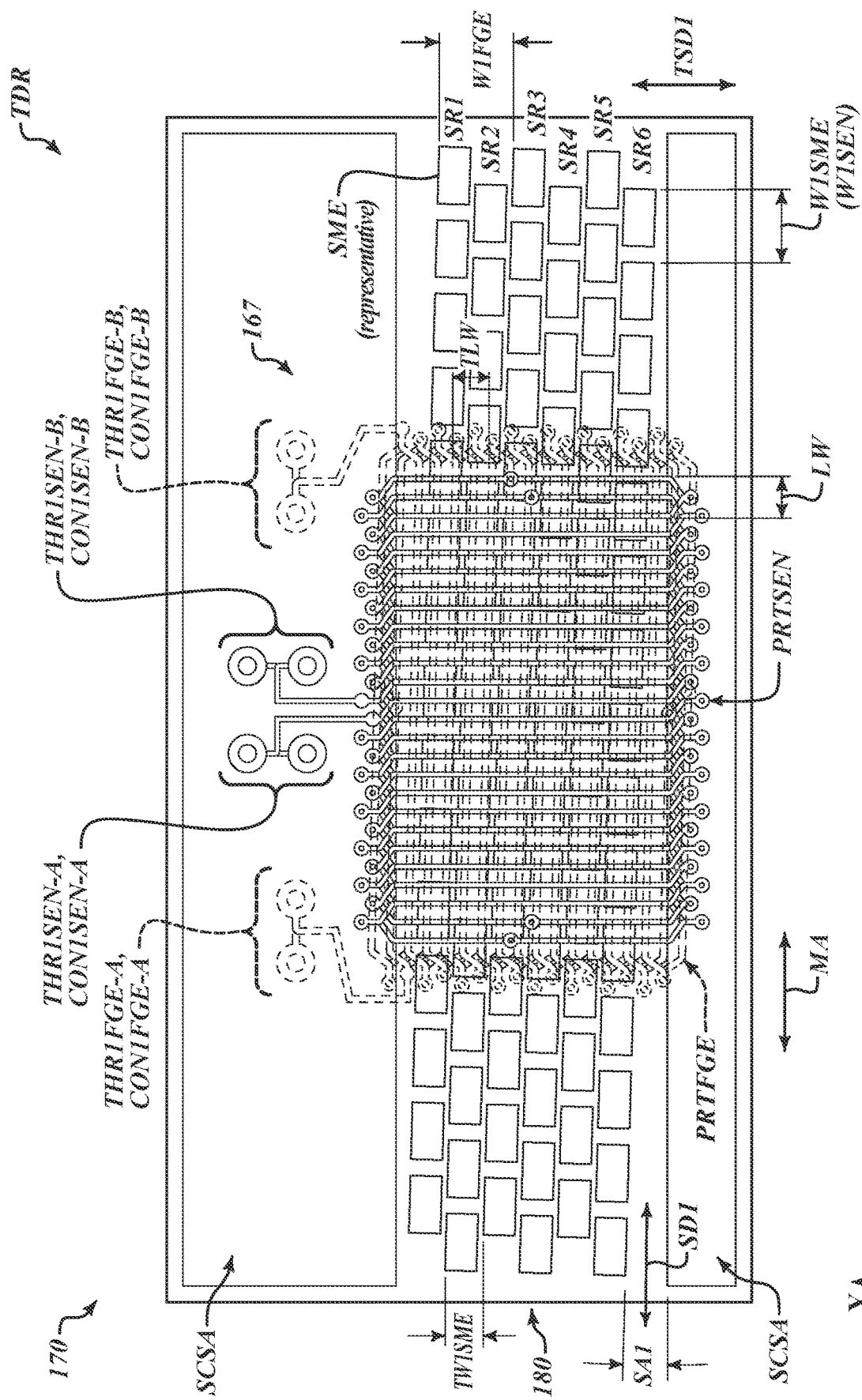
FIG. 2 is a diagram of a first implementation of a transducer including a scale and a detector portion such as may be utilized in the position encoder of FIG. 1.

FIG. 2 is a diagram of a transducer TDR formed in accordance with principles as disclosed herein. The transducer TDR includes a scale 170 and a detector portion 167, such as may be utilized in the position encoder 101 of FIG. 1. It will be appreciated that certain aspects of the field generating elements and sensing elements of a detector portion (e.g., detector portion 167, etc.) as described herein may operate and be understood based at least in part on principles as described above with respect to FIG. 19. In the implementation of FIG. 2, the scale 170, the detector portion 167 and a signal processing configuration 166 (e.g., of FIG. 1) work cooperatively to provide the inductive electronic position encoder 101 that is usable to measure a relative position between two elements (e.g., between the detector portion 167 and the scale 170 and/or elements attached thereto), along a measuring axis direction MA.

Figure 6:
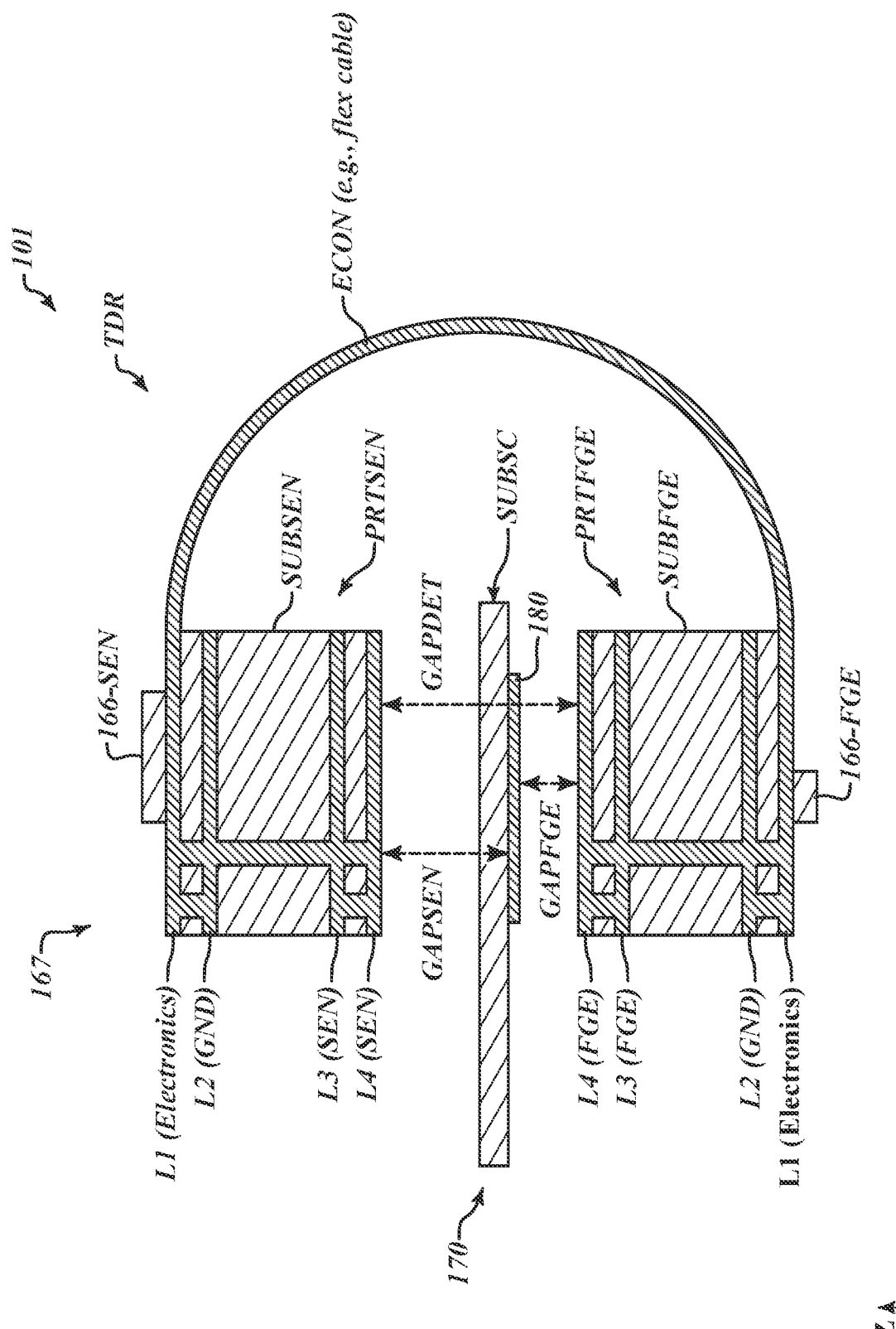
FIG. 6 is a diagram of an end view illustrating components of the transducer of FIG. 2 as located on substrates.

In various implementations, the scale 170 extends along the measuring axis direction MA (e.g., corresponding to an x-axis direction) and includes a periodic scale pattern 180, comprising signal modulating elements SME fabricated on a scale substrate (e.g., using known printed circuit fabrication methods, such as on a scale substrate SUBSC as illustrated in FIG. 6). In various implementations illustrated herein, the periodic scale pattern 180 may alternatively be referred to as a signal modulating pattern 180.

The relative movement between the detector portion 167 and the scale 170 may indicate relative positions and/or measurements (e.g., in relation to physical elements that may be coupled to the detector portion 167 or the scale 170, such as first and second objects for determining a relative position between the first and second objects, or first and second jaws or other measurement elements that an object may be placed between for measuring a dimension of the object, etc.) A measured relative position or dimension may be displayed on a display 138 (e.g., a digital display). In various implementations, control elements 136 such as an on/off switch and other optional control buttons may be included. The position encoder 101 may also include various known elements (e.g., physical mounting and/or motion elements, etc.) that are configured to guide the movement of the detector portion 167 (e.g., sliding, etc.) relative to the scale 170.

As shown in FIG. 2, the detector portion 167 may include a field generating portion PRTFGE and a sensing portion PRTSEN arranged along the measuring axis direction MA (i.e., as will be described in more detail below with respect to FIGS. 3 and 4). In one specific illustrative example, each of the field generating portion PRTFGE and the sensing portion PRTSEN of the detector portion 167 may be arranged parallel with and facing the scale 170 (e.g., on opposite sides of the scale 170), and a front face of the field generating portion PRTFGE that faces the scale 170 may be separated from a front face of the sensing portion PRTSEN that faces the opposite side of the scale 170 by a detector gap GAPDET along the Z axis direction (e.g., as will be described in more detail below with respect to FIG. 6). At least part of the scale 170 having a corresponding scale pattern 180 is thus between the field generating portion PRTFGE (on the back side of FIG. 2, as indicated by a broken-line arrow) and the sensing portion PRTSEN, in a transmissive configuration (e.g., as may be contrasted with a more traditional one-sided configuration, such as illustrated in FIG. 19 in relation to the incorporated '389 patent, which may be characterized as a type of reflective configuration). In various implementations, the front face of the field generating portion PRTFGE and/or the sensing portion PRTSEN (e.g., including the respective constituent conductors) may be covered by an insulative coating.

As also shown in FIG. 2 (e.g., and as will be described in more detail below with respect to FIG. 4), the field generating portion PRTFGE is connected to first field generating element conductors CON1FGE-A that pass through a first plurality of field generating element through-holes THR1FGE-A, and is connected to first offset field generating element conductors CON1FGE-B that pass through a first plurality of offset field generating element through-holes THR1FGE-B, which are located on the back side of FIG. 2 and thus illustrated in broken lines. The sensing portion PRTSEN is connected to first sensing element conductors CON1SEN-A that pass through a first plurality of sensing element through holes THR1SEN-A, and is connected to first offset sensing element conductors CON1SEN-B that pass through a first plurality of offset sensing element through holes THR1SEN-B (e.g., wherein through holes may be holes in substrates through which conductors pass for connecting elements that may be on different layers). In one specific illustrative example, two scale shield areas SCSA are provided as two strips that generally extend along the measuring axis direction MA and are located on either side of the scale pattern 180. In various implementations, the scale shield areas SCSA are configured to inhibit coupling between a set of field generating elements SETFGE of the field generating portion PRTFGE and a set of sensing elements SETSEN of the sensing portion PRTSEN, which may at least in part result from parasitic FGE-SEN (e.g., transmitter (Tx)-receiver (Rx)) mutual inductance created by the various through-holes THRs.

The illustrated portion of the scale pattern 180 includes a first type of signal modulating elements SME, which are arranged in scale rows SR1-SR6. The signal modulating elements SME may be configured in various shapes such as rectangles, or parallelograms with slanted top/bottom edges parallel to a first scale direction SD1 and vertical edges extending in y-axis direction (e.g., as more clearly illustrated in the examples of FIGS. 9-11). As illustrated in FIG. 2, the periodic scale pattern 180 has a first scale spatial wavelength W1SME and a first transverse scale spatial wavelength TW1SME, for which the signal modulating elements SME are disposed along the first scale direction SD1 and a first transverse scale direction TSD1 that corresponds to y-axis direction in the illustrated example.

The first scale spatial wavelength W1SME of the signal modulating elements SME may correspond to (e.g., may be equal to) a first sensing element spatial wavelength (or pitch) W1SEN of the sensing portion PRTSEN (e.g., as will be described in more detail below with respect to FIG. 3). The first transverse scale spatial wavelength TW1SME of the signal modulating elements SME may correspond to (e.g., may be equal to) ½ of a first field generating element spatial wavelength (or pitch) W1FGE of the field generating portion PRTFGE (e.g., as will be described in more detail below with respect to FIG. 4).

In various implementations, the first field generating element spatial wavelength (pitch) W1FGE is configured to be an integer multiple of the first sensing element spatial wavelength (pitch) W1SEN, wherein the integer multiple is at least 1 (e.g., as illustrated in FIG. 2 with an integer multiple of 1 for which W1FGE=W1SEN). This may have a technical advantage of making the resulting transducer TDR/encoder less sensitive (e.g., relatively insensitive) to a dynamic scale gap or pitch misalignment, such as misalignment between the sensing element gap GAPSEN and the field generating element gap GAPFGE (see FIG. 6).

In a specific illustrative example, the first type of signal modulating elements SME in scale rows SR1-SR6 are slanted, i.e., arranged at a first scale angle SA1 relative to the measuring axis direction MA, with top/bottom edges parallel to the first scale direction SD1, as will be more fully described below in reference to FIGS. 8-16 below.

In the illustrated implementation, the signal modulating elements SME comprise similar conductive plates (e.g., as formed by regions fabricated on a printed circuit board, or as formed by raised regions extending from a conductive substrate). However, in other implementations they may comprise similar conductive loops (e.g., as formed by traces on a printed circuit board). The scale pattern 180 is generally implemented on the scale 170. It will be appreciated that the scale pattern 180 moves relative to the detector portion 167 during operation. In various implementations, the scale pattern 180 may comprise various alternative spatially modulated patterns including alternative signal modulating element configurations, provided that the pattern has a spatial characteristics which changes as a function of position, so as to provide position dependent detector signals arising in the sensing elements SEN (see FIG. 3) of the sensing portion PRTSEN in the detector portion 167.

In various implementations, the detector portion 167 is configured to be mounted proximate to the scale pattern 180, and to move along the measuring axis direction MA relative to the scale pattern 180. In various implementations, the field generating portion PRTFGE and the sensing portion PRTSEN of the detector portion 167 may be formed according to a variety of alternative configurations to be used in combination with a variety of corresponding signal processing schemes, as will be understood by one skilled in the art.

It will be appreciated that the transducer TDR shown in FIG. 2 is one of various configurations that typically implement an electronic position encoder that has evolved over a number of years to provide a relatively optimized combination of compact size, low power operation (e.g., for long battery life), high resolution and high accuracy measurement, low cost, robustness to contamination, etc. Even small improvements in any of these factors in any of these configurations are highly desirable, but difficult to achieve, especially in light of the design constraints imposed in order to achieve commercial success in the various applications. The principles disclosed and claimed herein provide improvements in a number of these factors for various applications.

It will be appreciated that various elements may reside on different fabrication layers located at different planes along the z axis direction, as needed to provide various operating gaps and/or insulating layers, as will be apparent to one of ordinary skill in the art based on the following description and the incorporated references. Throughout the figures of this disclosure, it will be appreciated that the illustrated x axis, y axis and/or z axis dimensions of one or more elements may be exaggerated for clarity, but it will be understood that they are not intended to contradict the various design principles and relationships disclosed and claimed herein.

Figure 3:
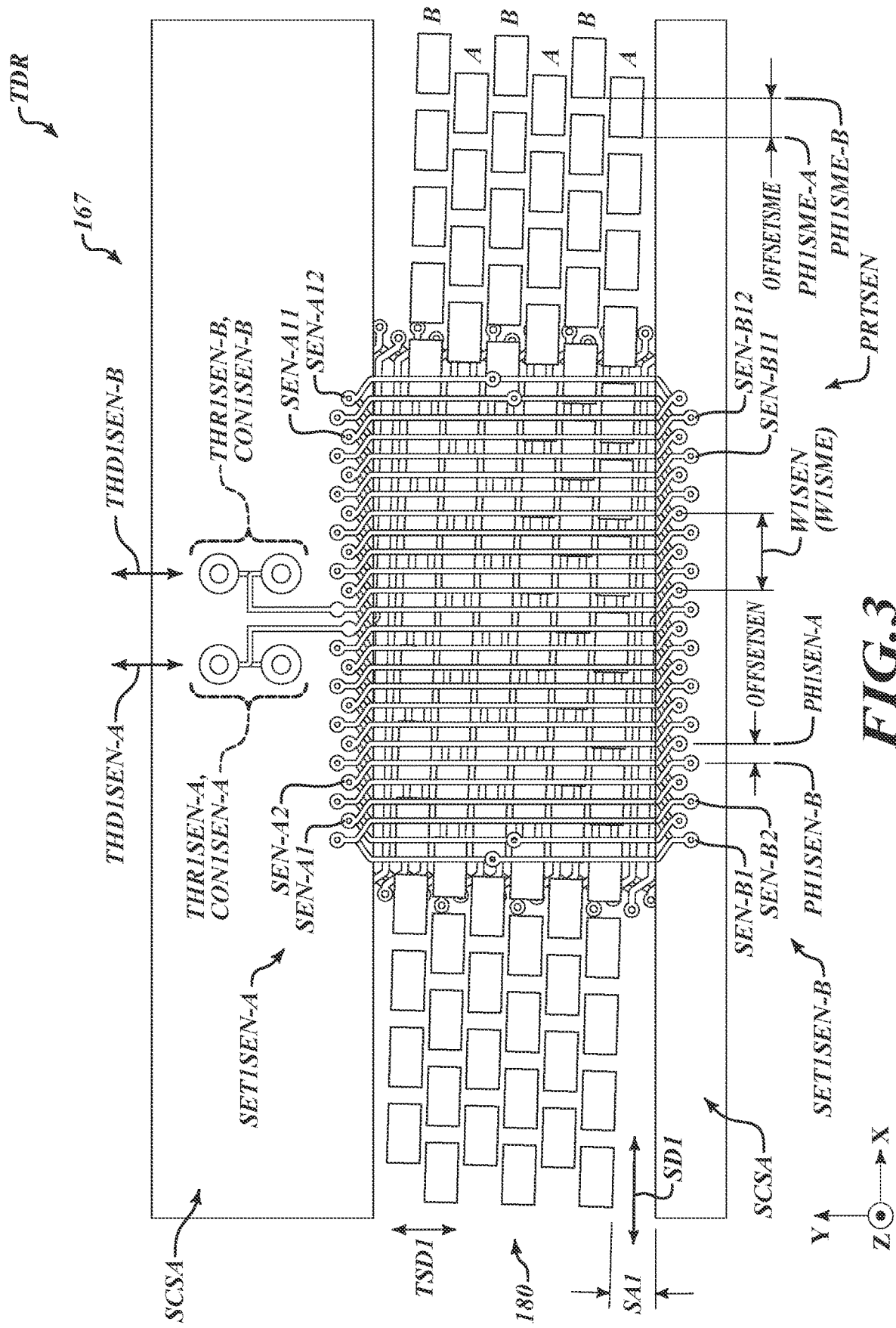
FIG. 3 is a diagram illustrating a sensing portion of the detector portion of FIG. 2.

FIG. 3 is a diagram further illustrating the sensing portion PRTSEN of the detector portion 167 of FIG. 2. As shown in FIG. 3, the sensing portion PRTSEN includes a first set of sensing elements SET1SEN-A (i.e., including twelve sensing elements SEN-A1 to SEN-A12) and a first set of offset sensing elements SET1SEN-B (i.e., including twelve sensing elements SEN-B1 to SEN-B12). For simplicity of the illustration, only the first two (i.e., A1-A2 and B1-B2) and last two (i.e., A11-A12 and B11-B12) sensing elements of each set are labeled in FIG. 3, although the sensing elements (i.e., A3-A10 and B3-B10) will similarly be understood to correspond to the remaining sensing elements as shown. The first sensing element spatial wavelength W1SEN of these sets of sensing elements SEN corresponds to (e.g., is equal to) the first scale spatial wavelength W1SME of the spatial modulating elements SME. In this implementation, the sensing elements SEN comprise sensing loop elements (alternatively referred to as sensing coil elements or sensing winding elements) which are connected in series and are nominally perpendicular relative to the measuring axis direction MA. As used herein, the term "nominally" encompasses variations of one or more parameters that fall within acceptable tolerances. As an example, in one implementation a term such as "nominally" may correspond to a minimal variance from a specified value (e.g., such as a variance of less than 5%, or less than 2%, or less than 1%, such as in accordance with acceptable tolerances, etc.)

In the illustrated implementation, adjacent loop elements in each respective set are connected by a configuration of conductors on various layers of PCB (e.g., connected by feedthroughs which may include conductors passing through through-holes) according to known methods such that they have opposite winding polarities (e.g., with the sensing elements in each respective set alternating between SEN+ and SEN−). That is, if a first loop responds to a changing magnetic field with a positive polarity detector signal contribution, then the adjacent loops respond with a negative polarity detector signal contribution. Loops having a positive polarity detector signal contribution may be designated SEN+ sensing elements herein, and loops having a negative polarity detector signal contribution may be designated SEN− sensing elements in various contexts herein. In exemplary implementations, each sensing loop element may have a maximum width LW along the measuring axis direction MA (see FIG. 2), which is nominally equal to ½ of the first sensing element spatial wavelength W1SEN. In various implementations, the sensing elements in each respective set are connected in series such that their detector signals or signal contributions are summed per set, and a "summed" detector signal is output at detector signal output connections (e.g., at the first sensing element conductors CON1SEN-A and the first offset sensing element conductors CON1SEN-B) to a signal processing configuration 166 (e.g., of FIG. 1).

The first set of sensing elements SET1SEN-A is connected to the first sensing element conductors CON1SEN-A that pass through the first plurality of sensing element through holes THR1SEN-A, wherein the first plurality of sensing element through holes THR1SEN-A are arranged to extend along a first sensing element through-hole direction THD1SEN-A. The first set of offset sensing elements SET1SEN-B are connected to the first offset sensing element conductors CON1SEN-B that pass through the first plurality of offset sensing element through holes THR1SEN-B, wherein the first plurality of offset sensing element through holes THR1SEN-B are arranged to extend along a first offset sensing element through-hole direction THD1SEN-B which is parallel with the first sensing element through-hole direction THD1SEN-A.

It will be appreciated that in various implementations it is advantageous to configure the detector to provide two or more sets of sensing elements (e.g., and/or two or more sets of field generating elements as disclosed herein) at different spatial phase positions (e.g., to provide or otherwise correspond to quadrature signals), as will be understood by one of ordinary skill in the art. Thus, the first set of sensing elements SET1SEN-A and the first set of offset sensing elements SET1SEN-B are at different spatial phase positions, as separated by a sensing element spatial phase offset OFFSETSEN between a first sensing element spatial phase PH1SEN-A and a first offset sensing element spatial phase PH1SEN-B (e.g., for which in certain implementations OFFSETSEN may be equal to ¼ W1SEN). Similarly, a first set of field generating elements SET1FGE-A and a first set of offset field generating element SET1FGE-B of the field generating portion PRTFGE described in FIG. 4 below are at different spatial phase positions. However, it should be appreciated that the configurations of sensing elements and field generating elements as described herein are intended to be exemplary only, and not limiting. As one example, individual sensing element loops may output individual signals to a corresponding signal processing configuration in some implementations, for example as disclosed in U.S. Pat. No. 9,958,294, which is hereby incorporated by reference in its entirety. More generally, various known sensing element configurations and/or field generating element conversions may be used in combination with the principles disclosed and claimed herein, for use in combination with various known scale pattern and signal processing schemes, in various implementations.

In various implementations, the signal modulating elements SME of the periodic scale pattern 180 may be grouped into two or more subsets, such as subset A (with some scale rows A) and subset B (with some scale rows B). In the periodic scale pattern 180, the scale rows SR may alternate between A and B, as illustrated, similar to alternating field generating elements FGE-A and FGE-B as will be described in more detail below with respect to FIG. 4. As noted above, in the periodic scale pattern 180, the signal modulating elements SME are disposed in scale rows SR (e.g., which may include alternating A and B scale rows) which each extend along the scale direction SD1. Each scale row with the signal modulating elements SME spaced according to a first scale spatial wavelength W1SME may have a spatial phase of the signal modulating elements SME in the first scale direction SD1. For adjacent scale rows in the periodic scale pattern 180, the spatial phase of each scale row may be offset from the spatial phase of an adjacent scale row by ½ of the first scale spatial wavelength W1SME. For example, as illustrated in FIG. 3, the adjacent and alternating A and B scale rows are at different spatial phase positions, as separated by a signal modulating element spatial phase offset OFFSETSME between a first signal modulating element spatial phase PH1SME-A and a first offset signal modulating element spatial phase PH1SME-B. In this example, the signal modulating element spatial phase offset OFFSETSME=½ of the first scale spatial wavelength W1SME (e.g., which may correspond to a 180 degree spatial phase shift/difference between the adjacent scale rows).

In the example of FIG. 3, the spatial phases PH1SME-A and PH1SME-B are illustrated as corresponding to certain locations within the corresponding two bottom scale rows. Each location within the respective scale row corresponds to a particular phase value of the periodic scale row. For example, if an illustrated location of the spatial phase PH1SME-A corresponds to a 0 degree spatial phase location of the periodic scale row A, then the illustrated location of the spatial phase PH1SME-B may similarly correspond to a 0 degree spatial phase location of the periodic scale row B. In various implementations, any corresponding same degree spatial phase location of the scale rows A and B may be selected for the indicators for the spatial phases PH1SME-A and PH1SME-B, and for which a spatial difference between the two correspondingly indicates the signal modulating element spatial phase offset OFFSETSME. Such principles are noted to apply to other spatial phases and offsets, etc. as described herein (e.g., such as will be described in more detail below with respect to FIG. 11).

Figure 4:
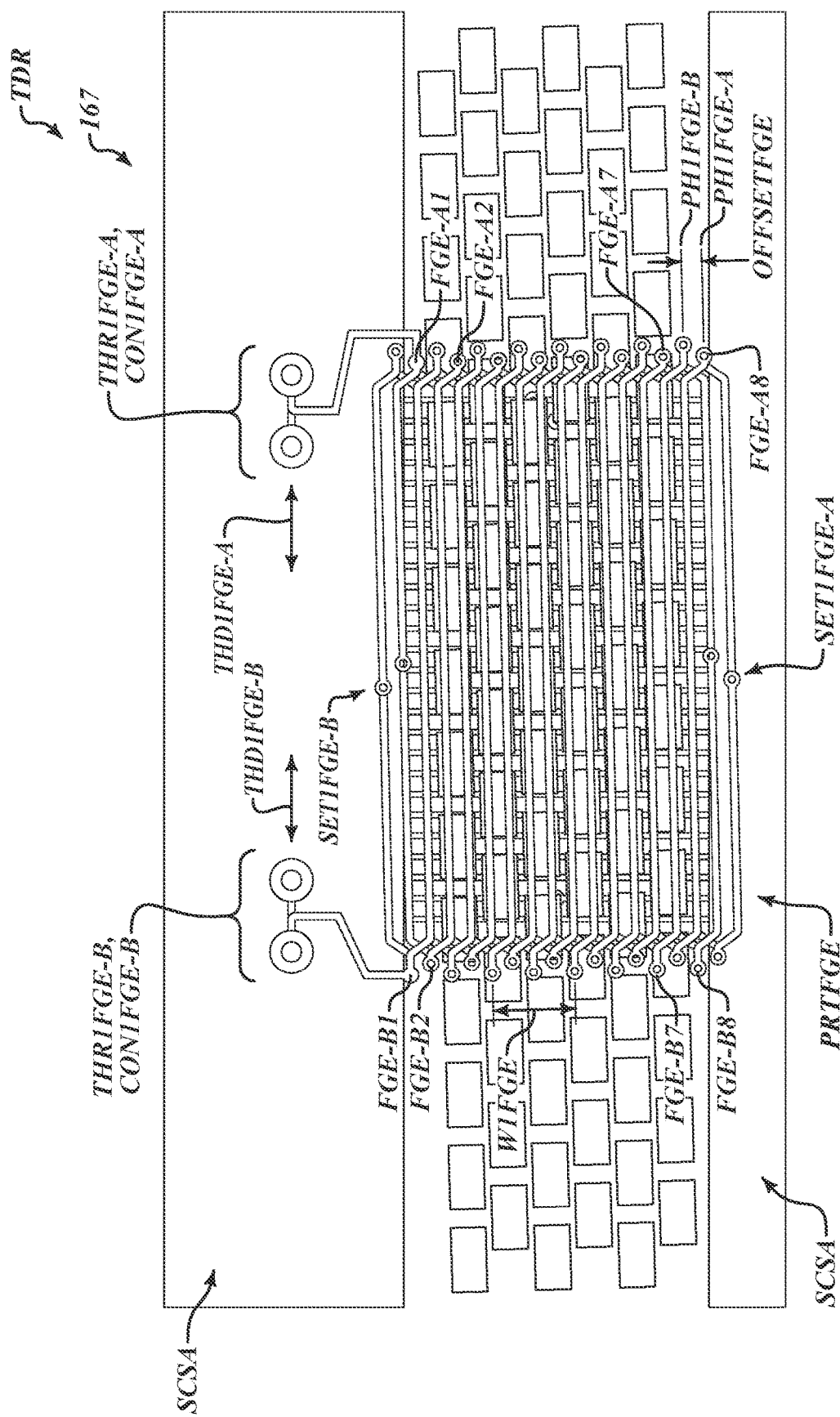
FIG. 4 is a diagram illustrating a field generating portion of the detector portion of FIG. 2.

FIG. 4 is a diagram illustrating the field generating portion PRTFGE of the detector portion 167 of FIG. 2. The field generating portion PRTFGE includes a first set of field generating elements SET1FGE-A (i.e., including eight field generating elements FGE-A1 to FGE-A8) and a first set of offset field generating elements SET1FGE-B (i.e., including eight field generating elements FGE-B1 to FGE-B8). For simplicity of the illustration, only the first two (i.e., A1-A2 and B1-B2) and last two (i.e., A7-A8 and B7-B8) field generating elements of each set are labeled in FIG. 4, although the field generating elements (i.e., A3-A6 and B3-B6) will similarly be understood to correspond to the remaining field generating elements as shown. The first field generating element spatial wavelength (or pitch) W1FGE of the field generating elements FGE corresponds to twice the first transverse scale spatial wavelength TW1SME (see FIG. 2, wherein TW1SME is nominally equal to ½ of W1FGE). In a specific illustrative example, the first set of field generating elements SET1FGE-A and the first set of offset field generating elements SET1FGE-B are at different spatial phase positions, as separated by a field generating element spatial phase offset OFFSETFGE between a first field generating element spatial phase PH1FGE-A and a first offset field generating element spatial phase PH1FGE-B (e.g., for which in certain implementations OFFSETFGE may be equal to ¼ W1FGE). The field generating elements FGE comprise field generating loop elements which are connected in series. In exemplary implementations, each field generating loop element has a maximum width TLW along the first transverse scale direction TSD1 (see FIG. 2), which is nominally equal to ½ of the field generating element spatial wavelength W1FGE.

The first set of field generating elements SET1FGE-A is connected to the first field generating element conductors CON1FGE-A that pass through the first plurality of field generating element through holes THR1FGE-A, wherein the first plurality of field generating element through holes THR1FGE-A are arranged to extend along a first field generating element through-hole direction THD1FGE-A. The first set of offset field generating elements SET1FGE-B are connected to the first offset field generating element conductors CON1FGE-B that pass through the first plurality of offset field generating element through holes THR1FGE-B, wherein the first plurality of offset field generating element through holes THR1FGE-B are arranged to extend along a first offset field generating element through-hole direction THD1FGE-B which is collinear with the first field generated element through-hole direction THD1FGE-A in the illustrated example. Arranging the first field generating element through-hole direction THD1FGE-A and the first offset field generating element through-hole direction THD1FGE-B nominally at 90° relative to (e.g., perpendicular to) the first sensing element through-hole direction THD1SEN-A and the first offset sensing element through-hole direction THD1SEN-B (and in various implementations preferably centered relative to the first sensing element through-holes THR1SEN-A and the first offset sensing element through-holes THR1SEN-B) may be advantageous in minimizing FGE-SEN (e.g., transmitter (Tx)-receiver (Rx)) mutual inductance that may be created by the various through-holes THRs.

Figure 5:
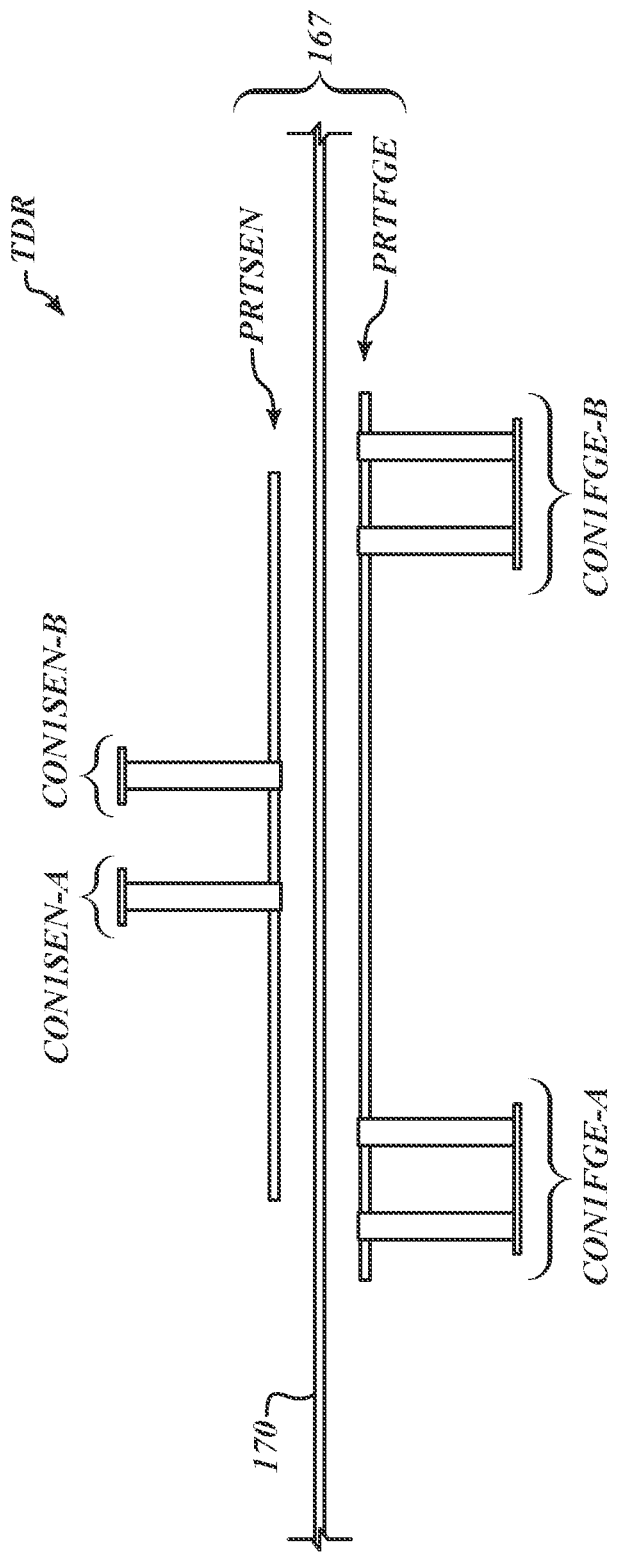
FIG. 5 is a diagram of a side view of the transducer of FIG. 2.

FIG. 5 is a diagram showing a side view of the transducer TDR of FIG. 2. The sensing portion PRTSEN and the field generating portion PRTFGE are arranged on opposite sides of the scale 170 to collectively constitute the detector portion 167. The first sensing element conductors CON1SEN-A and the first offset sensing element conductors CON1SEN-B connected from the sensing portion PRTSEN pass through, respectively, the first plurality of sensing element through holes THR1SEN-A and the first plurality of offset sensing element through holes THR1SEN-B. The first field generating element conductors CON1FGE-A and the first offset field generating element conductors CON1FGE-B connected from the field generating portion PRTFGE pass through, respectively, the first plurality of field generating element through-holes THR1FGE-A and the first plurality of offset field generating element through-holes THR1FGE-B.

FIG. 6 is a diagram showing a cross-sectional end view of components of the transducer TDR of FIG. 2 as located on substrates. In a specific illustrative example, the scale 170 including the first periodic scale pattern 180 is formed on the scale substrate SUBSC. The sensing portion PRTSEN is arranged above the first periodic scale pattern 180 and separated therefrom by a sensing element gap GAPSEN along the z axis direction. The field generating portion PRTFGE is arranged below the first periodic scale pattern 180 and separated therefrom by a field generating element gap GAPFGE along the z axis direction. A bottom face (e.g., a front face) of the sensing portion PRTSEN that faces the scale 170 is separated from a top face (e.g., a front face) of the field generating portion PRTFGE that faces the scale 170 by the detector gap GAPDET. In exemplary implementations, the first periodic scale pattern 180 may be closer to at least part of (e.g., a closest portion of) the first set of field generating elements SET1FGE-A of the field generating portion PRTFGE than to at least part of (e.g., a closest portion of) the first set of sensing elements SET1SEN-A of the sensing element portion PRTSEN (e.g., GAPFGE is smaller than GAPSEN, as illustrated in FIG. 6.) In certain implementations, this relationship may be reversed (e.g., with GAPSEN smaller than GAPFGE).

A planar sensing element substrate SUBSEN includes four layers L1-L4. Layer L1 comprises electronics including a signal processing portion 166-SEN, which may be part of the signal processing configuration 166 (FIG. 1) and which synchronizes the drive signals with the detector signals (e.g., from the sets of sensing elements SEN). Layer L2 comprises a ground connection (GND). Layers L3 and L4 comprise all sensing elements SEN (e.g., including all sets of sensing elements SETSEN), with different traces on different layers L3 and L4 (e.g., to electronically isolate at crossover portions, etc.). As noted above, the sensing element portion PRTSEN comprises all of the sensing elements SEN (e.g., including all sets of sensing elements SETSEN).

A planer field generating element substrate SUBFGE includes four layers L1-L4. Layer L1 comprises electronics including a signal processing portion 166-FGE, which may be part of the signal processing configuration 166 (FIG. 1). Layer L2 comprises a ground connection (GND). Layers L3 and L4 comprise all field generating elements FGE (e.g., including all sets of field generating elements SETFGE), with different traces on different layers L3 and L4 (e.g., to electronically isolate at crossover portions, etc.) As noted above, the field generating element portion PRTFGE comprises all of the field generating elements FGE (e.g., including all sets of field generating elements SETFGE).

In various implementations, at least part of the signal processing portion 166-SEN which synchronizes the drive signals with the detector signals is fixed to the planar sensing element substrate SUBSEN, for which an electronic connector ECON (e.g., flex cable) extends between the planar sensing element substrate SUBSEN and the planar field generating element substrate SUBFGE. The electronic connector ECON electrically couples the signal processing portion 166-SEN on the planar sensing element substrate SUBSEN to at least one of the signal processing portion 166-FGE or the first set of field generating elements SET1FGE-A (e.g., and in various implementations to the first set of offset field generating elements SET1FGE-B) on the planar field generating element substrate SUBFGE. In the specific illustrated example, the electronic connector ECON connects the electronics layer L1 of the sensing portion PRTSEN to the electronics layer L1 of the field generating portion PRTFGE, as part of the detector portion 167 comprising the sensing portion PRTSEN and the field generating portion PRTFGE. The detector portion 167 and the scale 170 in turn form the transducer TDR. In operation, the movement of the detector portion 167 along the measuring axis direction MA relative to the first periodic scale pattern 180 (e.g., for which MA is parallel to the x-axis which is orthogonal to the page in FIG. 6) corresponds to the planar sensing element substrate SUBSEN and the planar field generating element substrate SUBFGE moving relative to the first periodic scale pattern 180 with at least part of the first periodic scale pattern 180 located within the spacing of the nominal detector gap GAPDET between the first set of sensing elements SET1SEN-A (e.g., as at least partially included in the layer L4 of the sensing element substrate SUBSEN) and the first set of field generating elements SET1FGE-A (e.g., as at least partially included in the layer L4 of the field generating element substrate SUBFGE). It should be noted that the example illustrated in FIG. 6 using substrates to form the detector portion 167 may be utilized to form other configurations shown in later figures, for such as the example configuration of FIG. 10.

Figure 7:
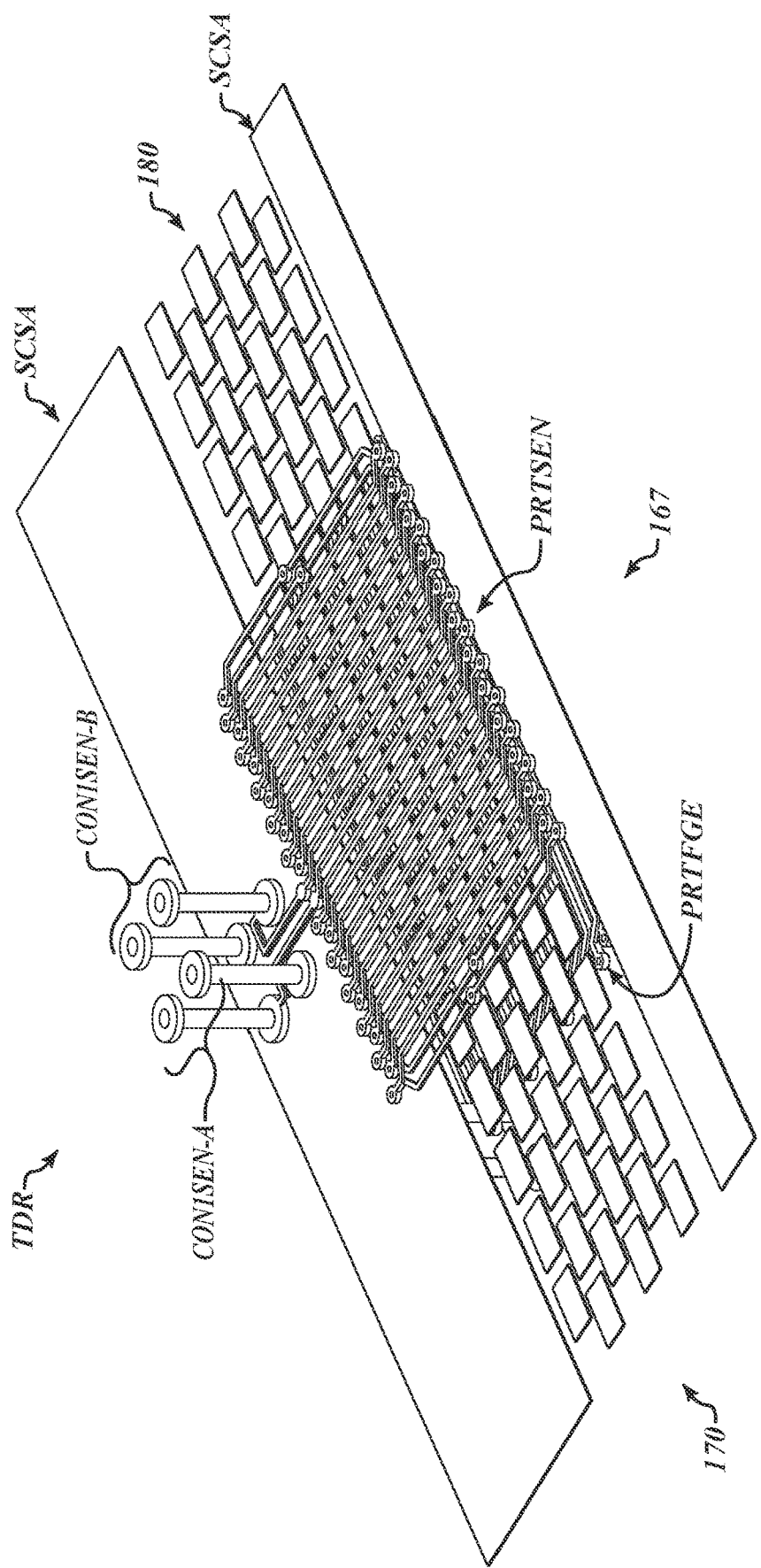
FIG. 7 is a diagram of a perspective view of the transducer of FIG. 2.

FIG. 7 is a diagram showing a top perspective view of the transducer TDR of FIG. 2. The transducer TDR includes the scale 170 having the scale pattern 180 (e.g., and including the scale shield areas SCSA), and the detector portion 167. The detector portion 167 includes the sensing portion PRTSEN, illustrated to lie above the scale 170, and the field generating portion PRTFGE, illustrated to lie beneath the scale 170. In accordance with the top perspective view, FIG. 7 also illustrates the first sensing element conductors CON1SEN-A and the first offset sensing element conductors CON1SEN-B (e.g., which are proximate to one of the scale shield areas SCSA), which respectively pass through the first plurality of sensing element through holes THR1SEN-A and the first plurality of offset sensing element through holes THR1SEN-B.

In relation to the configurations illustrated in FIGS. 1-7, in operation the first set of field generating elements SET1FGE-A and the first set of offset field generating elements SET1FGE-B each generate a changing magnetic flux in response to a coil drive signal (e.g., as provided from a signal processing configuration 166). In the illustrated implementations, the first field generating element conductors CON1FGE-A and the first offset field generating element conductors CON1FGE-B may be used to connect a coil drive signal from a signal processing configuration (e.g., the signal processing configuration 166 of FIG. 1) to the respective sets of field generating elements SET1FGE-A and SET1FGE-B.

The members of the first set of sensing elements SET1SEN-A and the first set of offset sensing elements SET1SEN-B are configured to provide detector signals which respond to a local effect on the changing magnetic flux provided by an adjacent signal modulating elements SME of the periodic scale pattern 180 (e.g., one or more signal modulating elements SME). A signal processing configuration (e.g., the signal processing configuration 166 of FIG. 1, etc.) may be configured to determine a position of the sensing portion PRTSEN (e.g., including all sets of sensing elements SETSEN) relative to the scale pattern 180 based on the detector signals input from the detector portion 167. For example, a first signal may come from the first set of sensing elements SET1SEN-A, and a second signal may come from the first set of offset sensing elements SET1SEN-B. The first and second signals may be input to the signal processing configuration 166 at conductors CON1SEN-A and conductors CON1SEN-B, respectively, and utilized for determining the measurement/position of the detector portion 167 relative to the scale 170. In general, the sets of sensing elements and/or field generating elements, or the like, may at least in part operate according to known principles (e.g., for inductive encoders), such as those described in the incorporated references and as described above in relation to FIG. 19.

In various implementations the detector portion 167 may be included in various types of measurement instruments and/or position determining configurations (e.g., linear scales, etc.). For example, the detector portion 167 may be fixed to a slide member, and the scale pattern 180 may be fixed to a beam or spar member having a measuring axis that coincides with an x-axis direction (e.g., in various implementations with the scale 170 including the scale pattern 180 extending or otherwise protruding from the beam or spar member it is mounted to and with the sensing element substrate SUBSEN and the field generating element substrate SUBFGE of the detector portion 167 mounted on opposite sides of the scale 170). In such a configuration, the detector portion 167 and the scale 170 may be movable relative to one another along the measuring axis direction MA in a plane that extends along the x-axis direction and a y-axis direction, with a z-axis direction being orthogonal to the plane.

Figure 8:
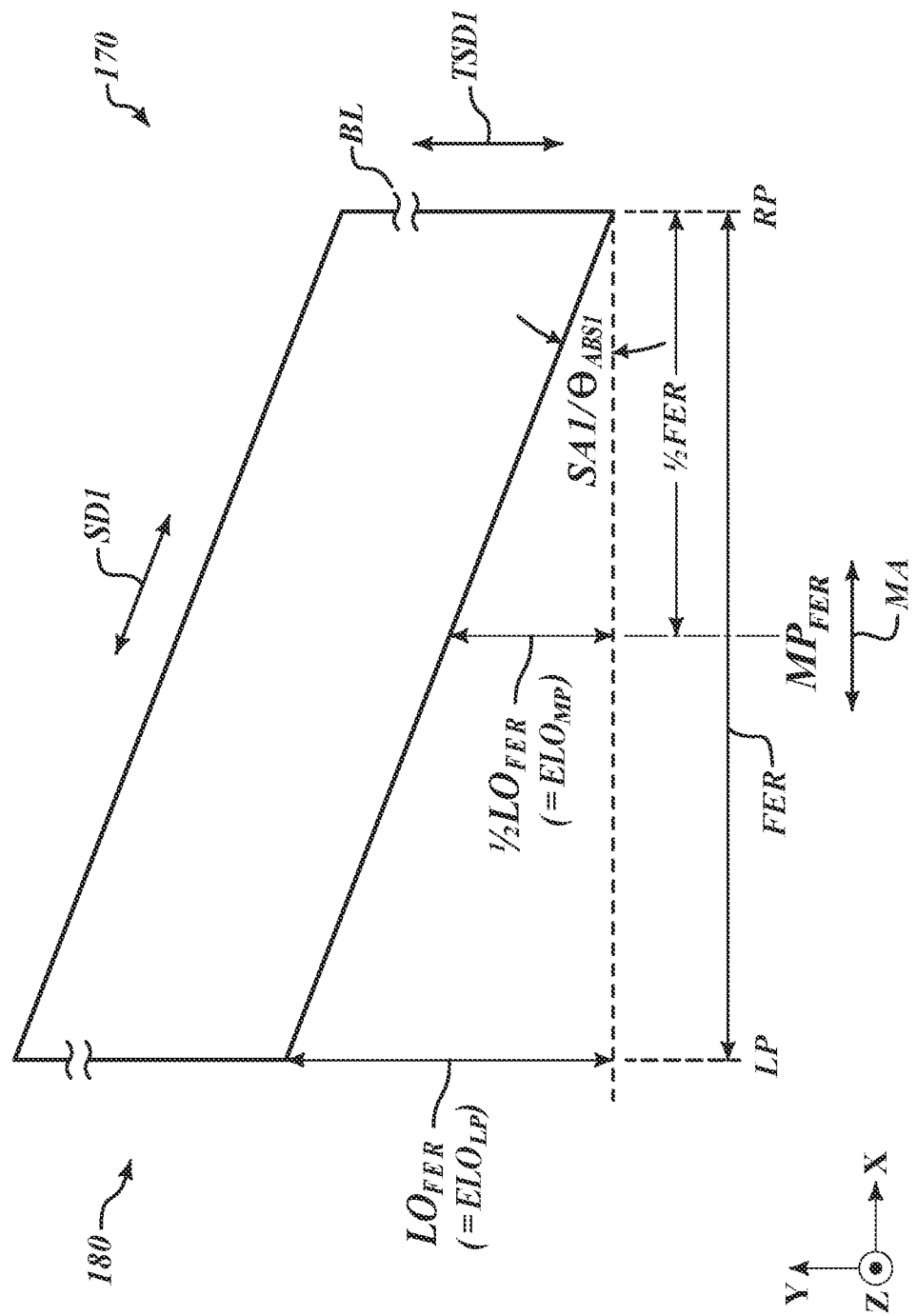
FIG. 8 is a diagram illustrating a lateral offset of a scale pattern that is slanted at a scale angle relative to a measuring axis direction.

FIG. 8 is a diagram illustrating a lateral offset $LO_{FER}$ of a periodic scale pattern 180 (e.g., similar to the scale pattern 180 of the transducer TDR of FIG. 2) that is slanted at a scale angle SA1 relative to a measuring axis direction MA. An example scale angle SA1 may be relatively small, for example, less than 5 degrees or 2 degrees, and/or at least 1 degree, in various exemplary implementations. With use of the slanted configuration, there is a corresponding y-direction displacement for a given x-direction displacement of the encoder, which makes it possible to design a very compact absolute inductive encoder as will be more fully described below. It will be appreciated that in the examples of FIGS. 8, 9, 15 and 16, the illustrated scale angles SA are exaggerated to more clearly illustrate certain concepts.

In FIG. 8, the scale pattern 180 of a scale 170 comprises a plurality of signal modulating elements SME (e.g., see FIG. 2) arranged along a first scale direction SD1 and a first transverse scale direction TSD1. In various exemplary embodiments, the scale pattern 180 may be slanted at the scale angle SA1 ($=\theta_{ABS1}$) relative to a measuring axis direction MA. $MP_{FER}$ refers to a middle position of the scale pattern 180, which is at a center of the full encoder range FER of the scale pattern 180 bound between a right position RP at the right end and a left position LP at the left end of the full encoder range FER. A lateral offset LO is an amount of offset in y-axis direction at a particular selected x-axis location along the measuring axis direction MA. $LO_{FER}$ refers to a lateral offset LO over the full encoder range FER, which is an amount of offset at the left position LP relative to the right position RP of the scale pattern 180 (i.e., the full encoder range FER). $LO_{FER}$ may be also referred to as an effective lateral offset ELO at the left position LP (i.e., $ELO_{LP}$). An effective lateral offset ELO at the middle position MP (i.e., $ELO_{MP}$) is an amount of offset at the middle position MP relative to the right position RP of the scale pattern 180 (i.e., ½ of the full encoder range FER (i.e., ½ FER)) and equals ½ $LO_{FER}$. Break lines BL inserted to side edges of the scale pattern 180 indicate that the dimension of the scale pattern in the y-axis direction may extend further.

In various exemplary implementations, the position encoder may be configured such that a total effective lateral offset of the first periodic scale pattern over a full encoder range FER is nominally equal to at least 1/10 of the first field generating element spatial wavelength (or pitch) W1FGE (FIG. 2). In various exemplary implementations, the total effective lateral offset of the first periodic scale pattern over the full encoder range is nominally equal to at least ⅕, or at least ¼, or at least ½ of the first field generating element spatial wavelength (or pitch) W1FGE. As illustrated in FIG. 4, the field generating portion PRTFGE that interacts with the slanted scale pattern may be similarly slanted at the same scale angle SA1 ($=\theta_{ABS1}$) in various implementations. In further implementations, the sensing element portion PRTSEN may be additionally slanted (e.g., so as to be perpendicular to the first scale direction SD1, such as with the sensing elements SEN slanted to be perpendicular to the first scale direction SD1).

Figure 9:
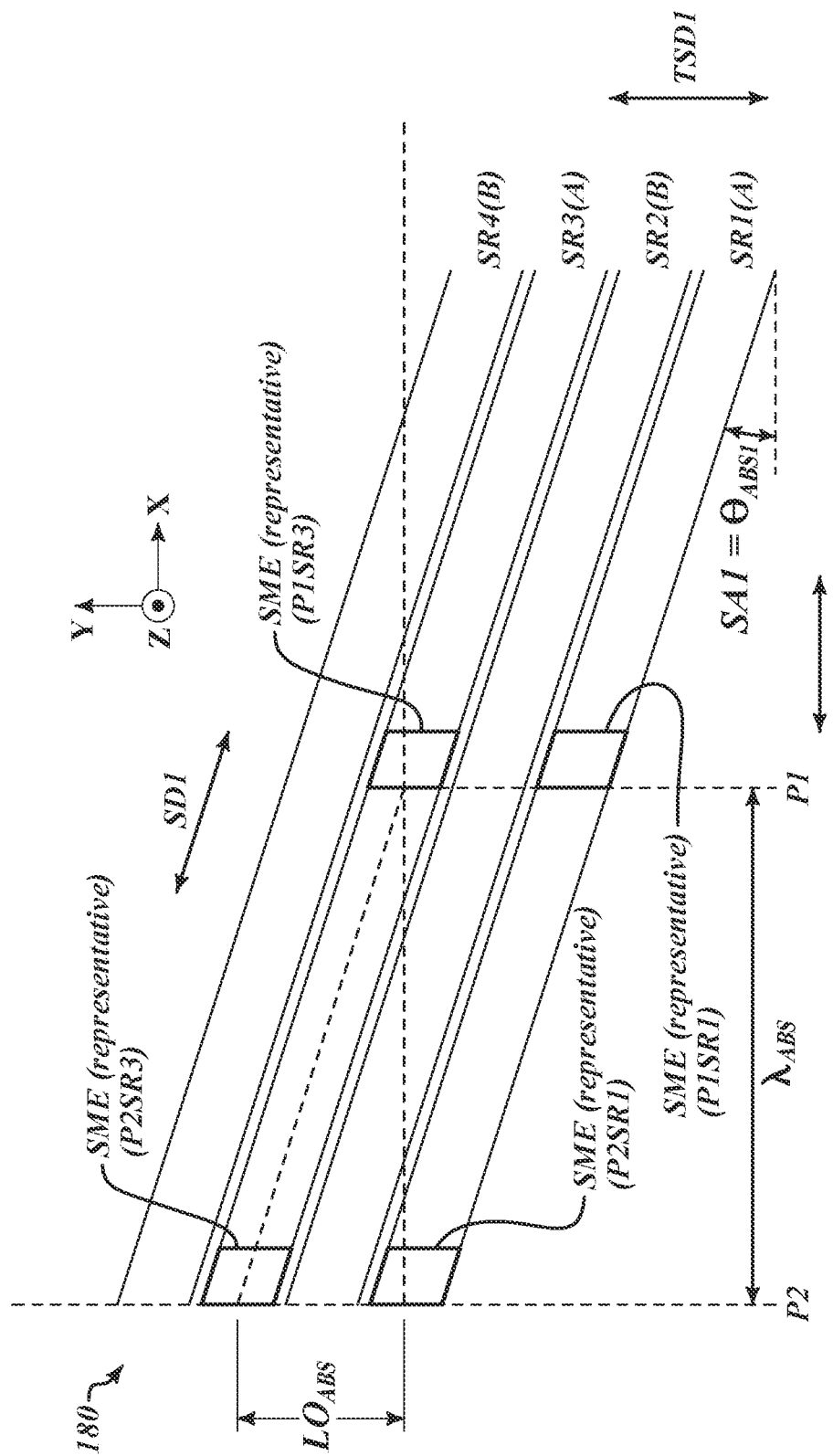
FIG. 9 is a diagram illustrating a lateral offset over an absolute range of a scale pattern that is slanted at a scale angle relative to a measuring axis direction.

FIG. 9 is a diagram illustrating a lateral offset over an absolute range $LO_{ABS}$ of a periodic scale pattern 180 that is slanted at a scale angle SA1 ($=\theta_{ABS1}$) relative to a measuring axis direction MA. In the example of FIG. 9, the periodic scale pattern 180 includes at least four scale rows SR1-SR4 each comprising a plurality of signal modulating elements SME (e.g., see FIG. 2). It will be appreciated that in various implementations it is advantageous to group the signal modulating elements SME into two or more subsets, such as subset A comprising scale rows SR1(A) and SR3(A), and subset B comprising scale rows SR2(B) and SR4(B). The scale rows may alternate between A and B, as illustrated, similar to alternating field generating elements FGE-A and FGE-B described above (e.g., see FIG. 4). In FIG. 9, two representative signal modulating elements SME at positions P1 and P2 in scale row SR1(A) of subset A are representatively illustrated as P1SR1 and P2SR1. Similarly, two representative signal modulating elements SME at positions P1 and P2 in scale row SR3(A) of the same subset A are representatively illustrated as P1SR3 and P2SR3. It will be appreciated that while for simplicity of the illustration FIG. 9 only shows the representative signal modulating elements SME (i.e., including P1SR1, P2SR1, P1SR3 and P2SR3), each scale row SR includes a closely spaced sequence of signal modulating elements SME as part of the periodic scale pattern 180 (e.g., similar to the scale patterns illustrated in FIGS. 2, 10, etc.).

An absolute range ($\lambda_{ABS}$) is defined as the distance along the x-axis before a portion of pattern change at a given y-axis location begins to repeat (e.g., before the slanted periodic scale pattern 180 in a scale row of, for example, subset A, starts to repeat in the next scale row of the same subset). Within such a range, certain relative signals resulting from the lateral offset (e.g., y-axis offset) of each of the signal modulating elements as movement is made along the x-axis direction will be relatively unique at each position along the x-axis. At the end of an absolute range, when movement continues into a next subsequent absolute range, the certain relative signals resulting from the lateral offset (e.g., y-axis offset) of each of the signal modulating elements as movement is made along the x-axis direction will repeat. In configurations of an encoder that is intended to have unique (e.g., absolute) position signals at each location along the x-axis, the scale may be configured to cover at most one absolute range (or only a portion thereof), in various implementations (e.g., as corresponding to a full encoder range for the given configuration of the encoder).

In FIG. 9, an absolute range $\lambda_{ABS}$ starts at position P1 along the x-axis, where the signal modulating element SME (P1SR1) in scale row SR1(A) and the signal modulating element SME (P1SR3) in scale row SR3(A) are located, and extends to position P2 along the x-axis where the signal modulating element SME (P2SR1) in scale row SR1(A) and the signal modulating element SME (P2SR3) in scale row SR3(A) are located. Because the periodic scale pattern 180 (i.e., including the scale rows SR1(A) and SR3(A)) is slanted at the scale angle SA1 (=$\theta_{ABS1}$) relative to the x-axis (the measuring axis direction MA), a relative portion of the periodic scale pattern 180 will start to repeat itself at a given y-axis location after a certain amount of movement along the x-axis direction. For example, the y-axis location of the signal modulating element SME (P2SR1) is shown to be the same as the y-axis location of the signal modulating element SME (P1SR3), and for which certain relative signals resulting from the lateral offset (e.g., y-axis offset) of each of the signal modulating elements as movement is made along the x-axis direction will begin to repeat at that point.

More specifically, for movement along the x-axis from left to right, the y-axis/lateral position of the signal modulating element SME (P1SR3) at position P1 is laterally offset relative to the y-axis position of the signal modulating element SME (P2SR3) at position P2, and is at the same y-axis position at which the periodic scale pattern starts to repeat itself in the next scale row of SR1(A) at the signal modulating element SME (P2SR1). That is, the y-axis position of the signal modulating element SME (P1SR3) in the scale row SR3(A) is the same as the y-axis position of the signal modulating element SME (P2SR1) in the next scale row SR1(A). Thus, the absolute range $\lambda_{ABS}$ may be considered a distance that the slanted periodic scale pattern 180 traverses in the x-axis direction to attain the y-axis/lateral position where the periodic scale pattern starts to repeat itself in the next scale row (e.g., of the same subset).

The lateral offset over the absolute range, $LO_{ABS}$, is a lateral offset in y-axis direction over the absolute range $\lambda_{ABS}$ in the x-axis direction. It will be appreciated that slanting the scale pattern by SA1 (=$\theta_{ABS1}$), such that there is a corresponding y-axis direction displacement for a given x-axis direction displacement of the encoder, makes each position within an absolute range have a unique combination of signals to permit detection of its absolute position, which in turn permits designing of a very compact absolute (ABS) inductive encoder (e.g., 8 mm×8 mm, FIG. 10). That is, more generally, the detector signals that are input from the detector portion 167 may indicate an absolute position along at least a portion of the scale pattern 180 based at least in part on the effective lateral offset ELO of signal modulation elements SME that are proximate to the detector portion 167.

It will be appreciated that unlike certain implementations of the scale patterns illustrated elsewhere herein (e.g., which may in some implementations represent "absolute" configurations within a single absolute wavelength), for purposes of illustrating certain principles, the scale pattern of FIG. 9 is shown as extending past a single absolute range (e.g., an which may correspondingly extend beyond a full encoder range for certain configurations). More specifically, the scale pattern 180 of FIG. 9 is illustrated as extending beyond a single absolute (ABS) wavelength/scale distance $\lambda_{ABS}$, which helps illustrate how such an absolute (ABS) wavelength/scale distance $\lambda_{ABS}$ may at least in part be defined.

Figure 10:
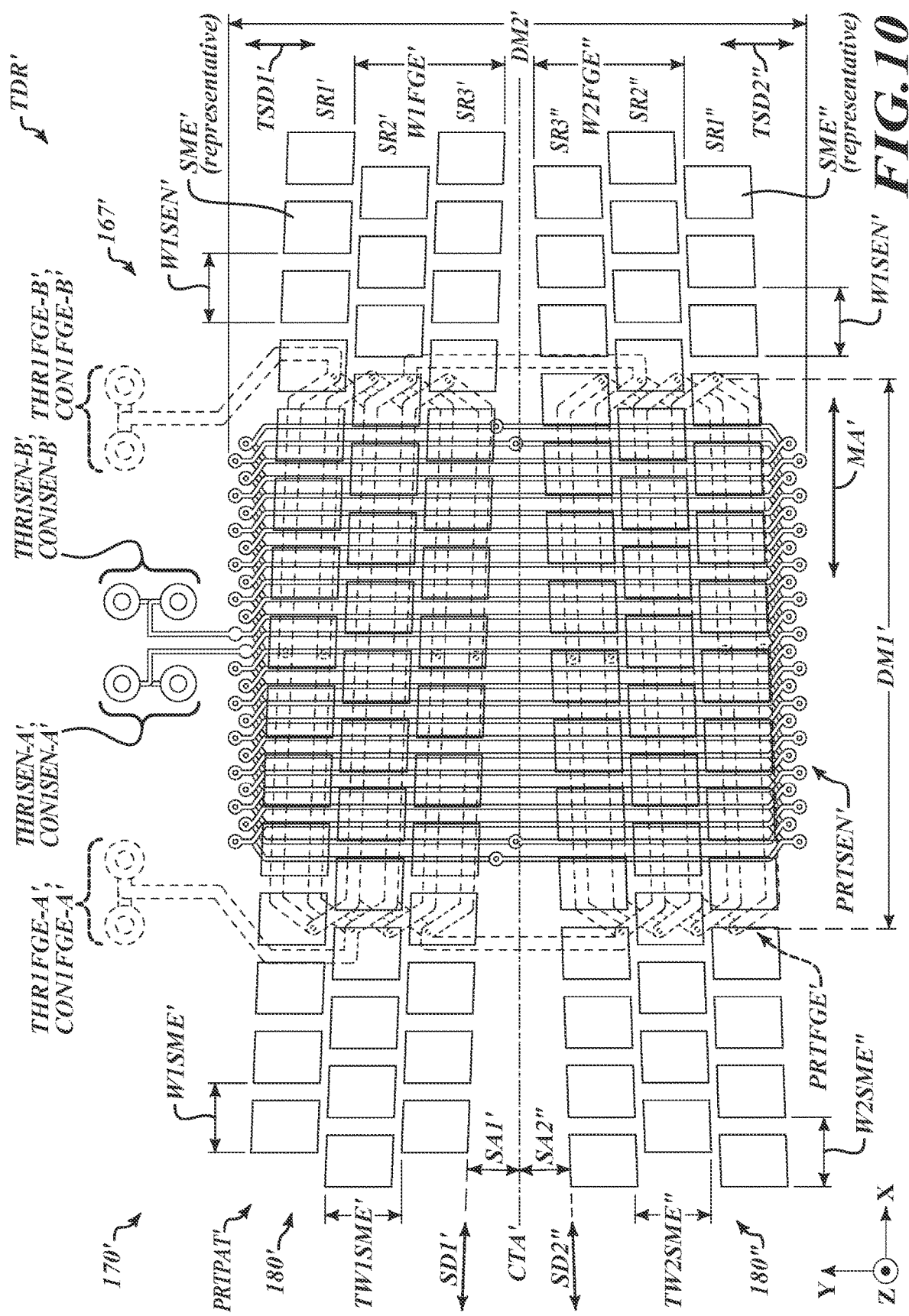
FIG. 10 is a diagram of a second implementation of a transducer including a scale and a detector portion such as may be utilized in the position encoder of FIG. 1.

FIG. 10 is a diagram of a second implementation of a transducer TDR' including a scale 170' and a detector portion 167' such as may be utilized in the position encoder 101 of FIG. 1. As illustrated, in the transducer TDR' certain portions are arranged in a mirror symmetric configuration about a central axis CTA'. Similar to the configurations described above, the detector portion 167' is configured to be mounted proximate to the scale 170' and to move along a measuring axis direction MA' relative to the scale 170' over a full encoder range.

Specifically, the scale 170' includes a pattern portion PRTPAT' which comprises a first periodic scale pattern 180' and a second periodic scale pattern 180". In various implementations, certain dimensions and/or other aspects of the second periodic scale pattern 180" may generally be at least in part symmetric with corresponding dimensions and/or aspects of the first periodic scale pattern 180' about the central axis CTA' of the scale 170', which is parallel to the measuring axis direction MA'. The first periodic scale pattern 180' includes a plurality of first signal modulating elements SME' arranged in first scale rows SR1' to SR3', and the second periodic scale pattern 180" includes a plurality of second signal modulating elements SME" arranged in second scale rows SR1" to SR3".

The first periodic scale pattern 180' has a first scale spatial wavelength W1SME' and a first transverse scale spatial wavelength TW1SME', for which the first signal modulating elements SME' are disposed along a first scale direction SD1' and a first transverse scale direction TSD1'. The second periodic scale pattern 180" has a second scale spatial wavelength W2SME" and a second transverse scale spatial wavelength TW2SME", for which the second signal modulating elements SME" are disposed along a second scale direction SD2" and a second transverse scale direction TSD2". The first scale direction SD1' is symmetric with the second scale direction SD2" about the central axis CTA' of the scale 170'. The first periodic scale pattern 180' is slanted relative to the central axis CTA' at a first scale angle SA1' (=$\theta_{ABS1}$). The second periodic scale pattern 180" is slanted relative to the central axis CTA' at a second scale angle SA2" (=$\theta_{ABS2}$) which is symmetric with the first scale angle SA1' (=$\theta_{ABS1}$) about the central axis CTA'.

In a specific illustrative example, the plurality of first signal modulating elements SME' arranged in first scale rows SR1' to SR3' are slanted, i.e., arranged at the first scale angle SA1' relative to the measuring axis direction MA', and the plurality of second signal modulating elements SME" arranged in second scale rows SR1" to SR3" are slanted, i.e., arranged at the second scale angle SA2" relative to the measuring axis direction MA'. The signal modulating elements SME' and SME" are noted to be configured in shapes of parallelograms, each having vertical edges (e.g., parallel to the y-axis) and having slanted top and bottom edges. More specifically, in the illustration of FIG. 10, the signal modulating elements SME' have slanted top and bottom edges parallel to the first scale direction SD1' and vertical edges parallel to the first transverse scale direction TSD1' (e.g., illustrated as being parallel to the y-axis). The signal modulating elements SME" have slanted top and bottom edges parallel to the second scale direction SD2" and vertical edges parallel to the second transverse scale direction TSD2" (e.g., illustrated as being parallel to the y-axis).

Figure 13:
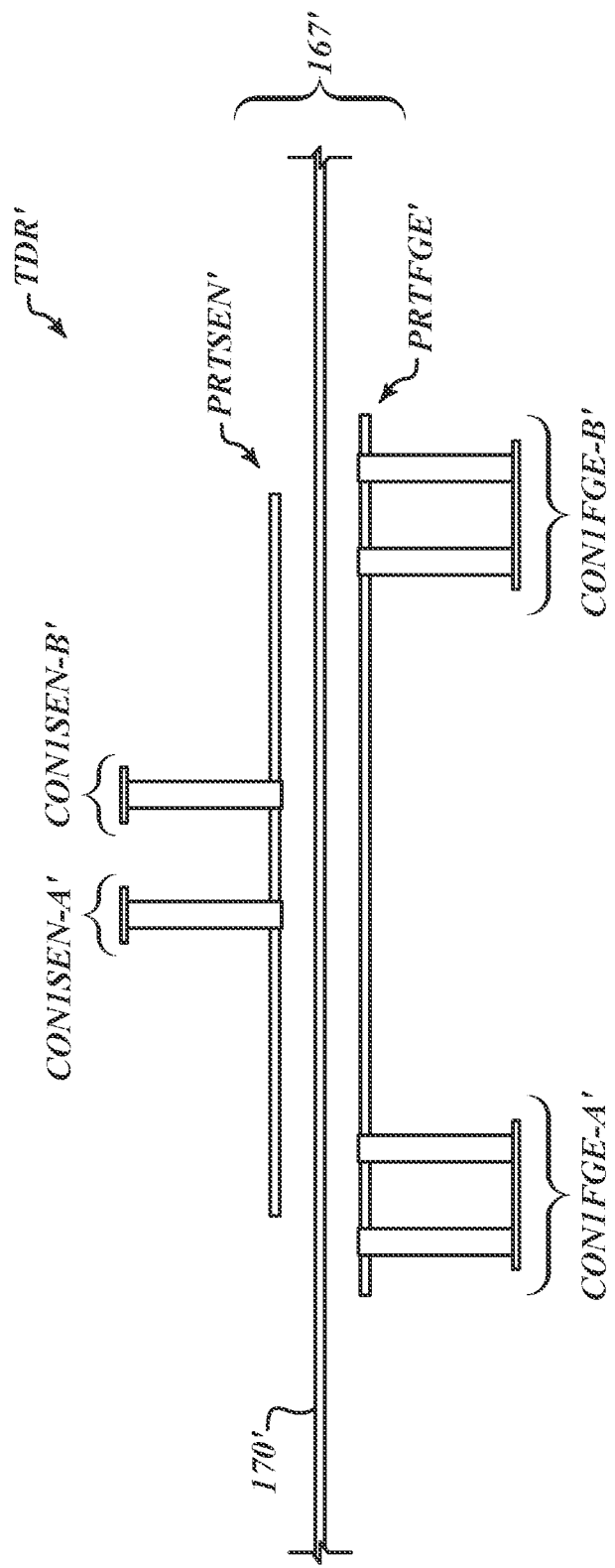
FIG. 13 is a diagram of a side view of the transducer of FIG. 10.

The detector portion 167' includes a sensing portion PRTSEN' and a field generating portion PRTFGE'. Referring additionally to FIG. 13, in one specific illustrative example, each of the sensing portion PRTSEN' and the field generating portion PRTFGE' may be arranged in parallel with and facing the scale 170' (e.g., on opposite sides of the scale 170'), similar to the configuration of FIG. 5 as described above. At least part of the scale 170' and corresponding scale patterns 180' and 180" is thus between the sensing element portion PRTSEN' and the field generating portion PRTFGE' (on the back side of FIG. 10, as indicated by broken lines and a broken-line arrow).

Figure 11:
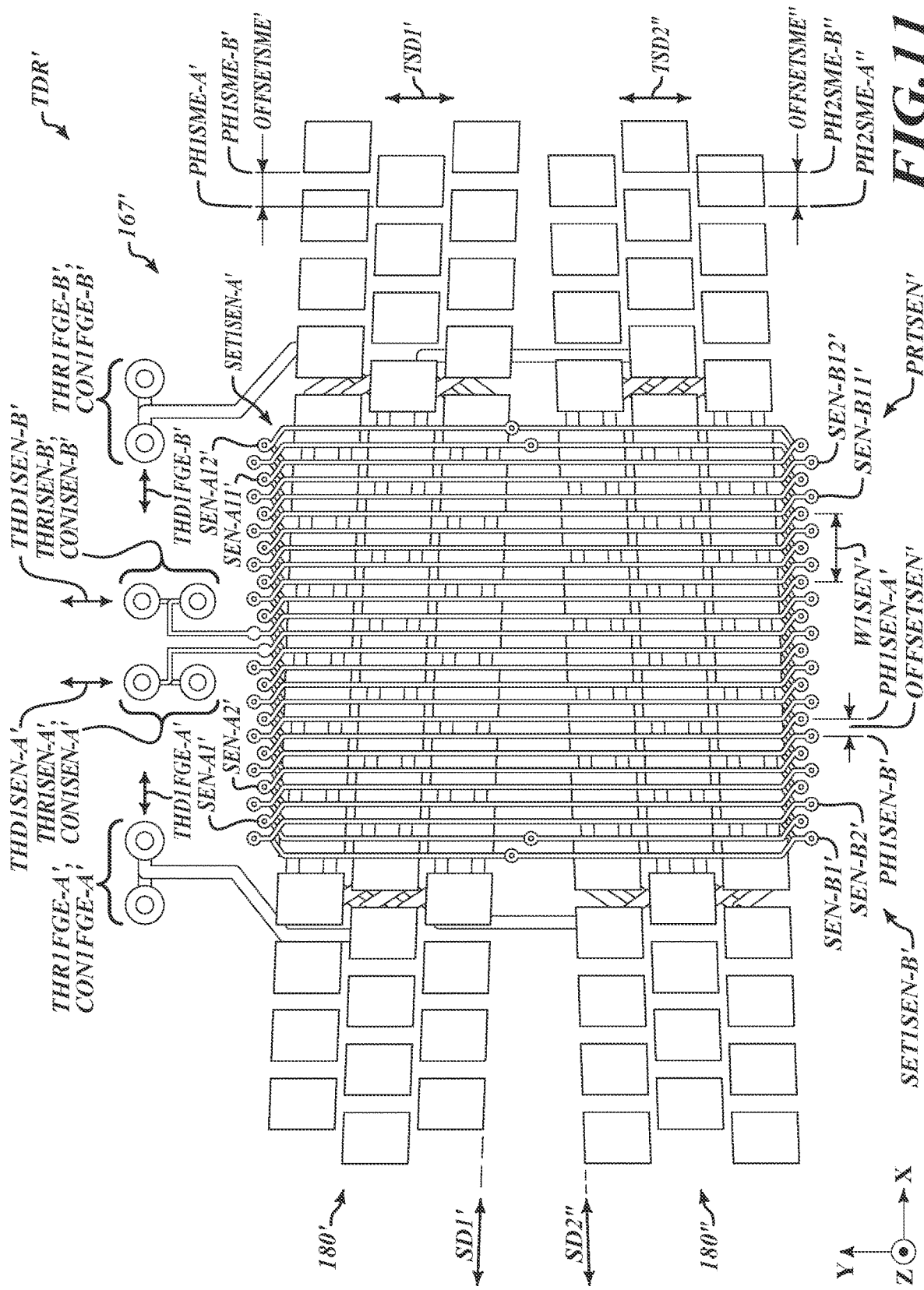
FIG. 11 is a diagram illustrating a sensing portion of the detector portion of FIG. 10.

As illustrated in FIG. 10 in additional reference to FIG. 11, the sensing portion PRTSEN' includes all sets of sensing elements SETSENs'. In various exemplary implementations, a first set of sensing elements SET1SEN-A' and a first set of offset sensing elements SET1SEN-B' are at different spatial phase positions, as separated by a sensing element spatial phase offset OFFSETSEN' between a first sensing element spatial phase PH1SEN-A' and a first offset sensing element spatial phase PH1SEN-6'. A first sensing element spatial wavelength (or pitch) W1SEN' of the sensing portion PRTSEN' (e.g., of each of the sets of sensing elements SET1SEN-A' and SET1SEN-B') may correspond to (e.g., be equal to) the first scale spatial wavelength W1SME' of the first periodic scale pattern 180' and also correspond to (e.g., be equal to) the second scale spatial wavelength W2SME" of the second periodic scale pattern 180". The first set of sensing elements SET1SEN-A' is connected to a first sensing element conductors CON1SEN-A' that pass through a first plurality of sensing element through holes THR1SEN-A', wherein the first plurality of sensing element through holes THR1SEN-A' are arranged to extend along a first sensing element through-hole direction THD1SEN-A'. The first set of offset sensing elements SET1SEN-B' are connected to first offset sensing element conductors CON1SEN-B' that pass through a first plurality of offset sensing element through holes THR1SEN-B', wherein the first plurality of offset sensing element through holes THR1SEN-B' are arranged to extend along a first offset sensing element through-hole direction THD1SEN-B' which is parallel to the first sensing element through-hole direction THD1SEN-A'.

While the sensing portion PRTSEN' of the specific illustrated example includes the first set of sensing elements SET1SEN-A' and the first set of offset sensing elements SET1SEN-B' that are extended in the y-axis direction to cover both the first periodic scale pattern 180' and the second periodic scale pattern 180", other configurations of the sensing portion PRTSEN' are possible. For example, the sensing portion PRTSEN' may include the first set of sensing elements SET1SEN-A' and the first set of offset sensing elements SET1SEN-B' for covering the first periodic scale pattern 180' and additionally include a second set of sensing elements SET2SEN-A" and a second set of offset sensing elements SET2SEN-B" for covering the second periodic scale pattern 180", for which signal processing may be used to combine the signals for determining the desired measurements/positions.

In various implementations, the signal modulating elements SME' and SME" may each be grouped into two or more subsets, such as subset A (with some scale rows A) and subset B (with some scale rows B), and for which the scale rows may alternate between A and B (e.g., similar to the configuration and description above with respect to FIG. 3). As noted above, in the periodic scale patterns 180' and 180", the signal modulating elements SME' and SME" are disposed in scale rows SR (e.g., which may include alternating A and B scale rows) which each extend along the scale direction SD1' and the scale direction SD2", respectively.

For the periodic scale pattern 180', each scale row with the signal modulating elements SME' spaced according to the first scale spatial wavelength W1SME' may have a spatial phase of the signal modulating elements SME' in the first scale direction SD1'. For adjacent scale rows in the periodic scale pattern 180', the spatial phase of each scale row may be offset from the spatial phase of an adjacent scale row by ½ of the first scale spatial wavelength W1SME'. For example, as illustrated in FIG. 11, the adjacent and alternating (e.g., A and B) scale rows are at different spatial phase positions, as separated by a signal modulating element spatial phase offset OFFSETSME' between a first signal modulating element spatial phase PH1SME-A' and a first offset signal modulating element spatial phase PH1SME-6'. In this example, the signal modulating element spatial phase offset OFFSETSME'=½ of the first scale spatial wavelength W1SME' (e.g., which may correspond to a 180 degree spatial phase shift/difference between the adjacent scale rows).

For the periodic scale pattern 180", each scale row with the signal modulating elements SME" spaced according to the second scale spatial wavelength W2SME" may have a spatial phase of the signal modulating elements SME" in the second scale direction SD2". For adjacent scale rows in the periodic scale pattern 180", the spatial phase of each scale row may be offset from the spatial phase of an adjacent scale row by ½ of the second scale spatial wavelength W2SME". For example, as illustrated in FIG. 11, the adjacent and alternating (e.g., A and B) scale rows are at different spatial phase positions, as separated by a signal modulating element spatial phase offset OFFSETSME" between a second signal modulating element spatial phase PH2SME-A" and a second offset signal modulating element spatial phase PH2SME-B'. In this example, the signal modulating element spatial phase offset OFFSETSME"=½ of the second scale spatial wavelength W2SME" (e.g., which may correspond to a 180 degree spatial phase shift/difference between the adjacent scale rows). In implementations where certain aspects of the periodic scale pattern 180" are symmetric with the periodic scale pattern 180' (e.g., such as illustrated in FIG. 11), various corresponding dimensions and/or features of the respective patterns (e.g., including the corresponding offsets and spatial phases) may be similar or equivalent (e.g., OFFSETSME"=OFFSETSME', etc.) In various implementations, the second scale spatial wavelength W2SME" may be equal to the first scale spatial wavelength W1SME' which may be equal to the first sensing element spatial wavelength W1SEN'. The second transverse scale spatial wavelength TW2SME" may be equal to the first transverse scale spatial wavelength TW1SME'.

Figure 12:
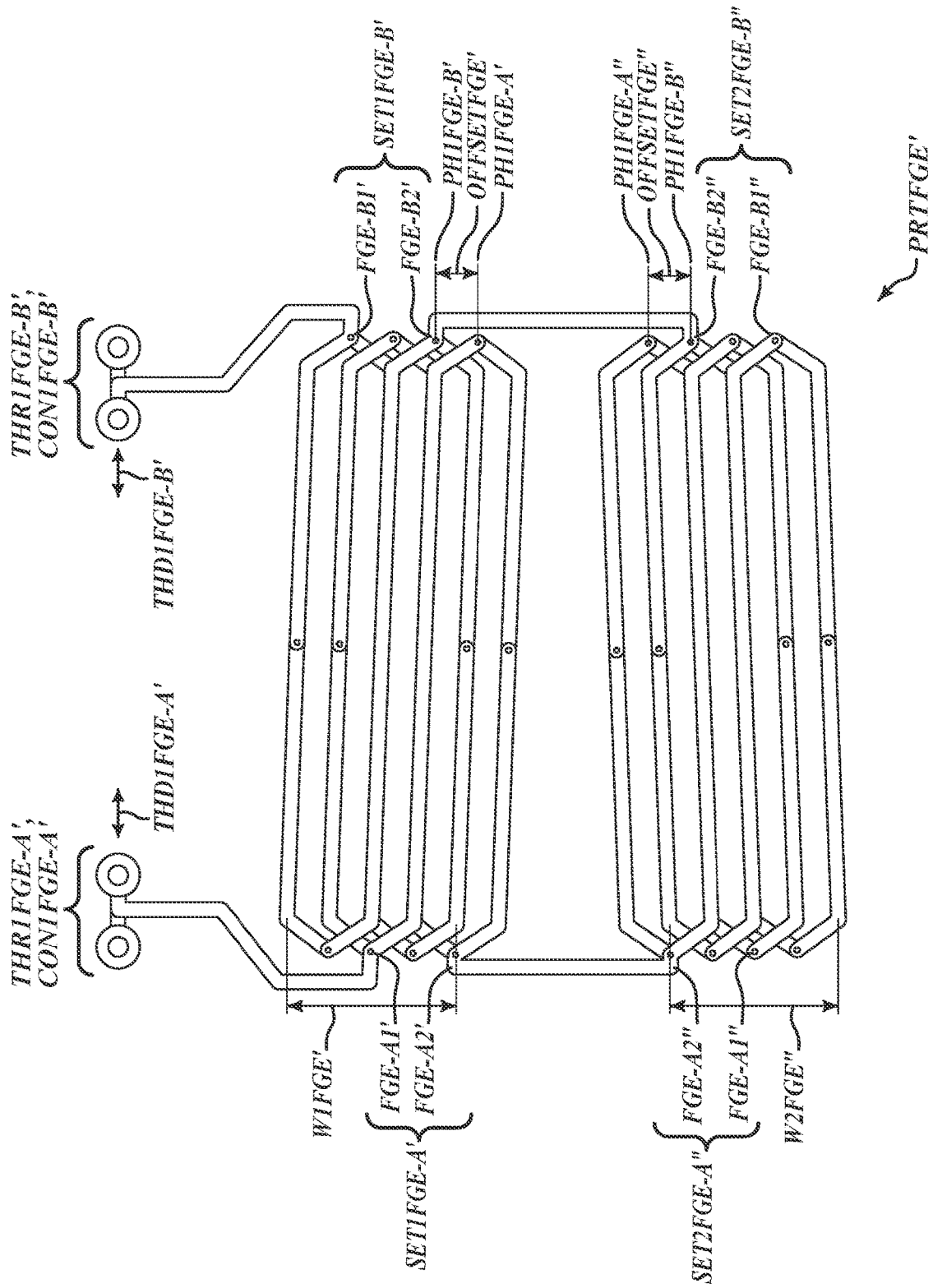
FIG. 12 is a diagram illustrating a field generating portion of the detector portion of FIG. 10.

Referring back to FIG. 10 and in additional reference to FIG. 12, the field generating portion PRTFGE' includes all sets of field generating elements SETFGEs' and SETFGEs". In various exemplary implementations, a first set of field generating elements SET1FGE-A' and a first set of offset field generating elements SET1FGE-B' are at different spatial phase positions, as separated by a field generating element spatial phase offset OFFSETFGE' between a first field generating element spatial phase PH1FGE-A' and a first offset field generating element spatial phase PH1FGE-6'. In various implementations, the first set of field generating elements SET1FGE-A' and the first set of offset field generating elements SET1FGE-B' of the field generating portion PRTFGE' (e.g., including the upper portion in FIG. 12) may be configured to interact with (e.g., be proximate to during operation) the first periodic scale pattern 180'. A first field generating element spatial wavelength (or pitch) W1FGE' of the sets of field generating elements SET1FGE-A' and SET1FGE-B' of the field generating portion PRTFGE' may correspond to (e.g., may be equal to) twice the first transverse scale spatial wavelength TW1SME' of the first periodic scale pattern 180' (e.g., for which in certain implementations OFFSETFGE' may be equal to ¼ W1FGE').

A second set of field generating elements SET2FGE-A" and a second set of offset field generating elements SET2FGE-B" are at different spatial phase positions, as separated by a field generating element spatial phase offset OFFSETFGE" between a second field generating element spatial phase PH1FGE-A" and a second offset field generating element spatial phase PH1FGE-B". In various implementations, the second set of field generating elements SET2FGE-A" and the second set of offset field generating elements SET2FGE-B" of the field generating portion PRTFGE' (e.g., including the lower portion in FIG. 12) may be configured to interact with (e.g., be proximate to during operation) the second periodic scale pattern 180". A second field generating element spatial wavelength (or pitch) W2FGE" of the sets of field generating elements SET2FGE-A" and SET2FGE-B" of the field generating portion PRTFGE" may correspond to (e.g., may be equal to) twice the second transverse scale spatial wavelength TW2SME" of the second periodic scale pattern 180" (e.g., for which in certain implementations OFFSETFGE" may be equal to ¼ W2FGE"). In various implementations where the field generating portion PRTFGE' is in a symmetric configuration (e.g., as illustrated in FIG. 12), various corresponding dimensions and/or features of the upper and lower portions (e.g., including the corresponding offsets, etc.) may be equivalent (e.g., OFFSETFGE"=OFFSETFGE', etc.) In various implementations, the second field generating element spatial wavelength W2FGE" may be equal to the first field generating element spatial wavelength W1FGE'.

The first and second sets of field generating elements SET1FGE-A' and SET2FGE-A", which are connected in series, are connected to first field generating element conductors CON1FGE-A' that pass through a first plurality of field generating element through holes THR1FGE-A', wherein the first plurality of field generating element through holes THR1FGE-A' are arranged to extend along a first field generating element through-hole direction THD1FGE-A'. The first and second sets of offset field generating elements SET1FGE-B' and SET2FGE-B", which are connected in series, are connected to first offset field generating element conductors CON1FGE-B' that pass through a first plurality of offset field generating element through holes THR1FGE-B', wherein the first plurality of offset field generating element through holes THR1FGE-B' are arranged to extend along a first offset field generating element through-hole direction THD1FGE-B' which is collinear with the first field generating element through-hole direction THD1FGE-A' in the illustrative example. Though not illustrated, scale shield area(s) SCSA' similar to SCSA of FIG. 2 may be added to support the field generating portion PRTFGE' and the sensing portion PRTSEN' of the detector portion 167', to suppress (e.g., reduce) direct FGE-SEN (e.g., transmitter (Tx)-receiver (Rx)) mutual inductance that may be created by the various through-holes THRs. coupling (e.g., due to parasitic FGE-SEN mutual inductance that may be created by the various through-holes THRs).

FIG. 10 illustrates the detector portion 167' having a first dimension DM1' in x-axis direction and a second dimension DM2' in y-axis direction. In a specific illustrative example, DM1=DM2=8 mm, which allows for designing of a very compact transducer TDR' having a reduced size relative to a conventional transducer (e.g., by a factor of 4× for certain implementations). An even more compact transducer TDR may be achieved in certain implementations with the detector portion 167 having a single scale pattern 180, such as illustrated and described with respect to FIG. 2.

Figure 14:
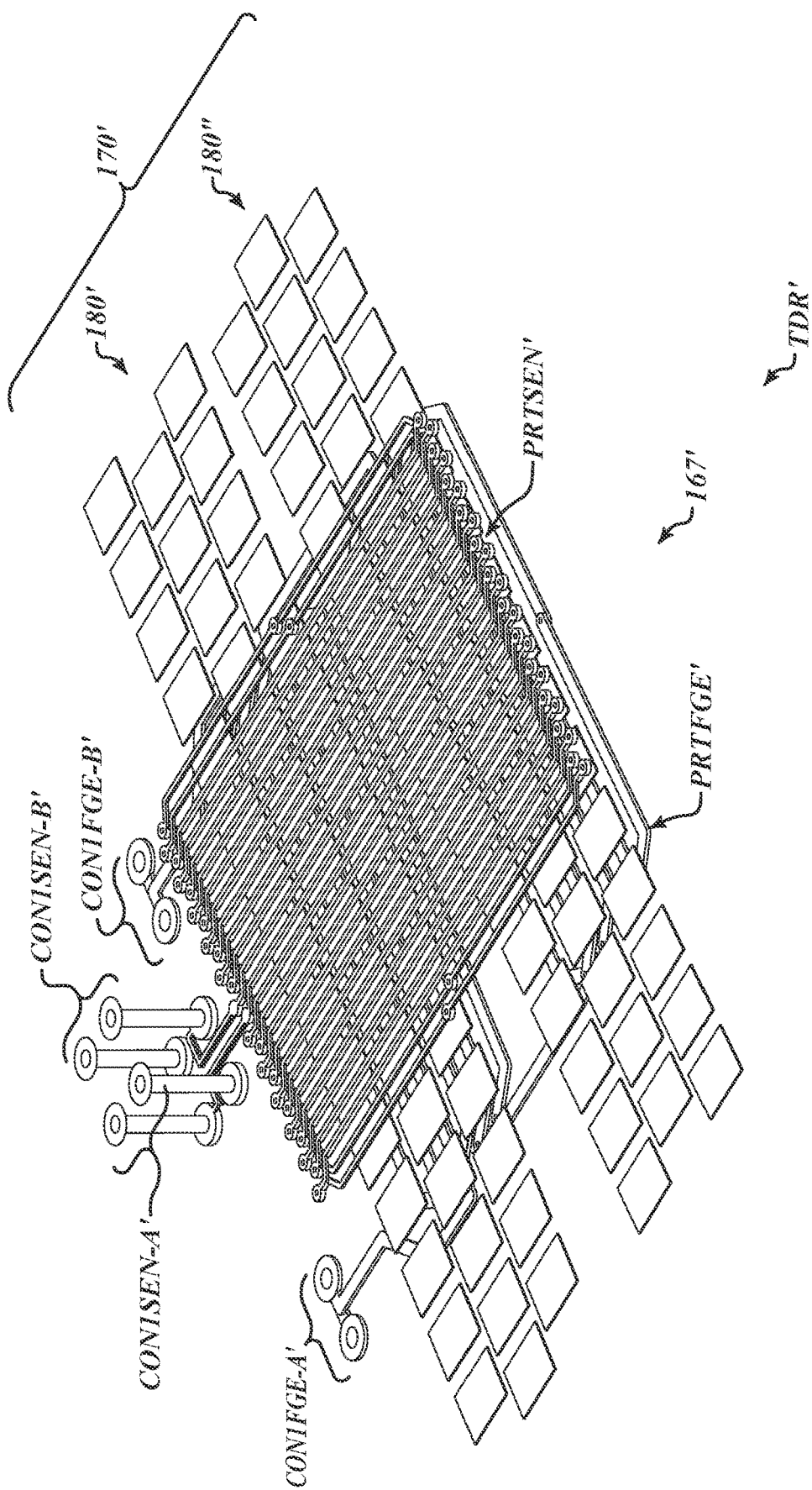
FIG. 14 is a diagram of a perspective view of the transducer of FIG. 10.

FIG. 14 is a diagram showing a top perspective view of the transducer TDR' of FIG. 10. The transducer TDR' includes the scale 170' having the first scale pattern 180' and the second scale pattern 180", and the detector portion 167'. The detector portion 167' includes the sensing portion PRTSEN' illustrated to lie above the scale 170', and the field generating portion PRTFGE' illustrated to lie beneath the scale 170'. In accordance with the top perspective view, FIG. 7 also illustrates the first sensing element conductors CON1SEN-A' and the first offset sensing element conductors CON1SEN-B' (e.g., as connected to the sensing portion PRTSEN') which pass through the corresponding plurality of sensing element through holes. Also illustrated are the bottoms of the first field generating element conductors CON1FGE-A' and the first offset field generating conductors CON1FGE-B' as connected to the field generating portion PRTFGE' which pass through the corresponding plurality of field generating element through holes.

In relation to the configurations illustrated in FIGS. 10-14, in operation the first and second sets of field generating elements SET FGE-A' and SET2FGE-A" and the first and second sets of offset field generating elements SET1FGE-B' and SET2FGE-B" each generate a changing magnetic flux in response to a coil drive signal from a signal processing configuration (e.g., the signal processing configuration 166 of FIG. 1). The members of the first set of sensing elements SET1SEN-A' and the first set of offset sensing elements SET1SEN-B' are configured to provide detector signals which respond to a local effect on the changing magnetic flux provided by adjacent signal modulating elements SME of the first and second periodic scale patterns 180' and 180" (e.g., one or more signal modulating elements SME). A signal processing configuration (e.g., the signal processing configuration 166 of FIG. 1, etc.) may be configured to determine a position of the sensing portion PRTSEN' (e.g., including all sets of sensing elements SETSEN') relative to the first scale pattern 180' and the second scale pattern 180" based on the detector signals input from the detector portion 167'. Because of the mirror symmetric configuration of the detector portion 167', errors due to misalignments that may be introduced from the first scale pattern 180' and the second scale pattern 180" may be canceled, to achieve the transducer TDR' that is less sensitive to misalignment or other imperfection of the scale 170' as compared to a conventional transducer. In some implementations, it may be advantageous for the first and second scale patterns 180' and 180" to each include an odd number of scale rows SR rather than an even number of scale rows, to help at least some of the signal offsets to subtract rather than add to each other, depending on the signal processing.

Figure 15:
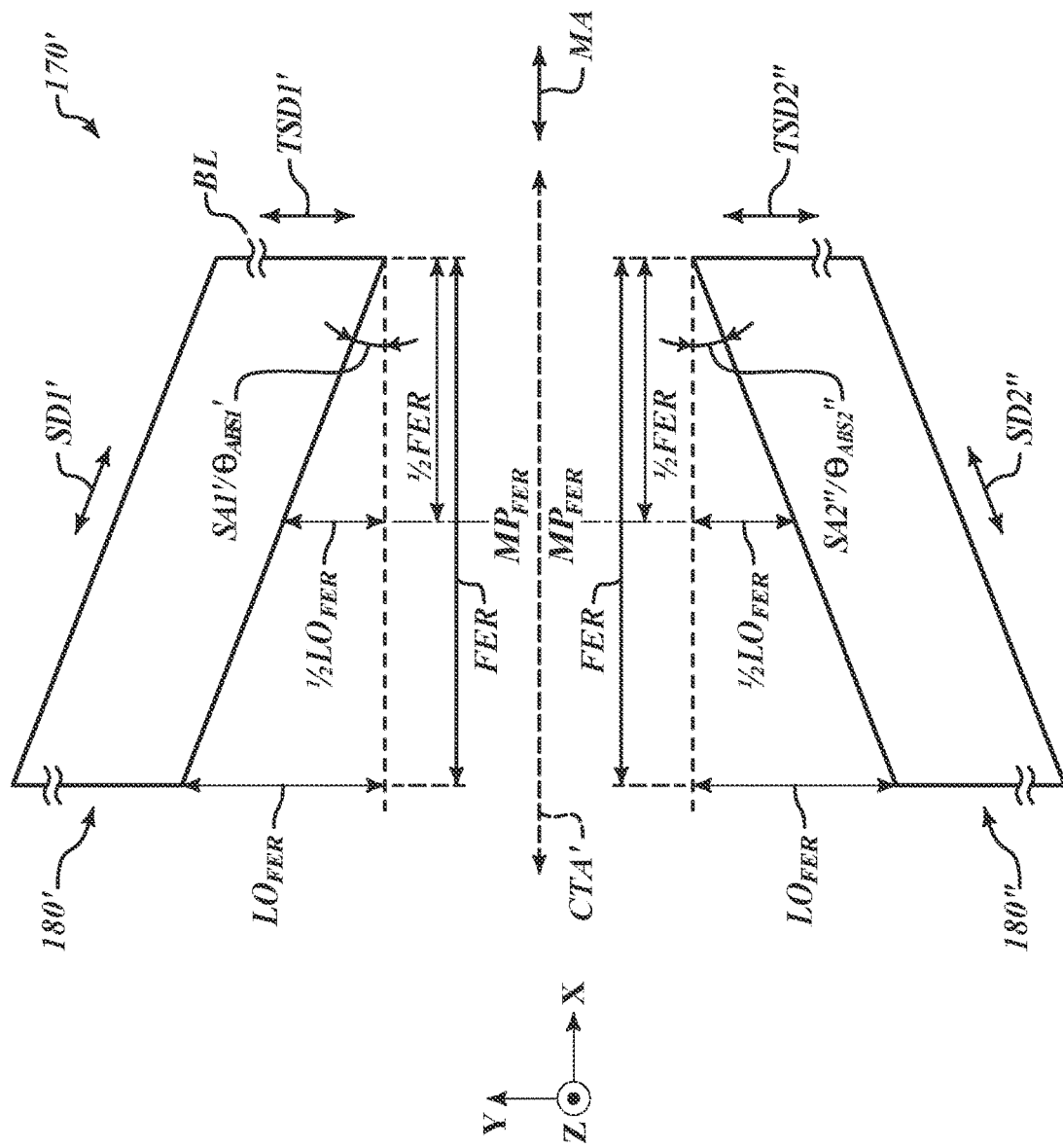
FIG. 15 is a diagram illustrating lateral offsets of first and second scale patterns that are slanted at symmetric scale angles relative to a measuring axis direction.

FIG. 15 is a diagram illustrating lateral offsets of first and second scale patterns 180' and 180" (e.g., similar to those of FIG. 10) that are slanted at first and second scale angles SA1' (=$\theta_{ABS1'}$) and SA2" (=$\theta_{ABS2''}$) relative to a measuring axis direction MA (e.g., in a relatively symmetric configuration). Following the principles described above in reference to FIG. 8, signal modulating elements of the first scale pattern 180' of the scale 170' are arranged along a first scale direction SD1' and a first transverse scale direction TSD1'. $MP_{FER}$ refers to a middle position of the first scale pattern 180', which is at a center of the full encoder range FER of the first scale pattern 180'. $LO_{FER}$ refers to a lateral offset LO in y-axis direction over the full encoder range FER in x-axis direction. A lateral offset at the middle position, $MP_{FER}$, is ½ the lateral offset of the full encoder range $LO_{FER}$, i.e., ½ $LO_{FER}$. The signal modulating elements of the second scale pattern 180" of the scale 170' are arranged along a second scale direction SD2" and a second transverse scale direction TSD2". Certain aspects of the second scale pattern 180" are relatively symmetric with the first scale pattern 180' about the center axis CTA' of the scale 170'. $MP_{FER}$ refers to a middle position of the second scale pattern 180", which is at a center of the full encoder range FER of the second scale pattern 180". $LO_{FER}$ refers to a lateral offset LO in y-axis direction over the full encoder range FER of the second scale pattern 180" in x-axis direction. A lateral offset at the middle position, $MP_{FER}$, is ½ the lateral offset of the full encoder range $LO_{FER}$, i.e., ½ $LO_{FER}$.

FIG. 16 is a diagram illustrating elements of a third implementation of a transducer TDR" including a detector portion 167" such as may be utilized in the position encoder of FIG. 1. The transducer TDR" includes a pattern portion PRTPAT" including the first and second scale patterns 180' and 180" similar to those of the transducer TDR' described with respect to FIG. 10 and FIG. 15 above. The pattern portion PRTPAT'" further includes an unslanted periodic scale pattern UPSP'" similar to the prior art unslanted periodic scale pattern UPSP" of FIG. 19 described above. The unslanted periodic scale pattern UPSP" is arranged along a measuring axis direction MA and centered on a central axis CTA" of the scale 170'" about which certain aspects of the first scale pattern 180' are relatively symmetric with the second scale pattern 180".

The transducer TDR'" includes a detector portion 167'" which includes a field generating portion PRTFGE'" and a sensor portion PRTSEN'" that are arranged to be centered at a middle position of the detector portion $MP_{DP}$. The sensing portion PRTSEN'" includes all sets of sensing elements SETSENs. The field generating portion PRTFGE" includes all sets of field generating elements SETFGEs, including a first set of field generating elements SET1FGE-A' and a first set of offset field generating elements SET1FGE-B' which interact with (e.g., are proximate to during operation) the first scale pattern 180', and a second set of field generating elements SET2FGE-A" and a second set of offset field generating elements SET2FGE-B" which interact with (e.g., are proximate to during operation) the second scale pattern 180". The field generating portion PRTFGE'" also includes an unslanted field generating element portion UFGEP'" similar to the prior art unslanted field generating element portion UFGEP"" of FIG. 19 described above. The unslanted field generating element portion UFGEP'" is disposed along the measuring axis direction MA and is not slanted relative to the measuring axis direction MA and is configured to generate a changing magnetic flux in response to a drive signal and to operate in conjunction with (e.g., be proximate to during operation) the unslanted periodic scale pattern UPSP'". Thus, the detector portion 167'" of the transducer TDR'" combines the slanted mirror-symmetric detector portion 167' of FIG. 10 with the unslanted detector portion 167"" of FIG. 19 to achieve technical advantages of both configurations.

FIG. 17 is a flow diagram illustrating a method 1700 for operating a position encoder with field generating elements and sensing elements on opposite sides of a scale. Any of the transducers (TDR, TDR', TDR'") described above or modifications thereof may be used to configure the position encoder. In block 1710, a position encoder (101) provides drive signals to cause a first set of field generating elements (e.g., SET1FGE-A) to generate a changing magnetic flux, wherein the first set of field generating elements (SET1FGE-A) and a first set of sensing elements (e.g., SET1SEN-A) are part of a detector portion (e.g., 167) and are on opposite sides of a first periodic scale pattern (e.g., 180) along a direction perpendicular to a measuring axis direction (e.g., MA), for which at least part of the first periodic scale pattern (180) is between the first set of field generating elements (SET1FGE-A) and the first set of sensing elements (SET1SEN-A).

In block 1720, the position encoder (101) receives detector signals from the first set of sensing elements (SET1SEN-A), wherein the detector signals respond to a local effect on a changing magnetic flux provided by adjacent signal modulating elements (SME) of the first periodic scale pattern (180). In block 1730, the position encoder (101) determines a relative position between the detector portion (e.g., 167) and the first periodic scale pattern (180) based at least in part on detector signals from the detector portion.

Figure 18:
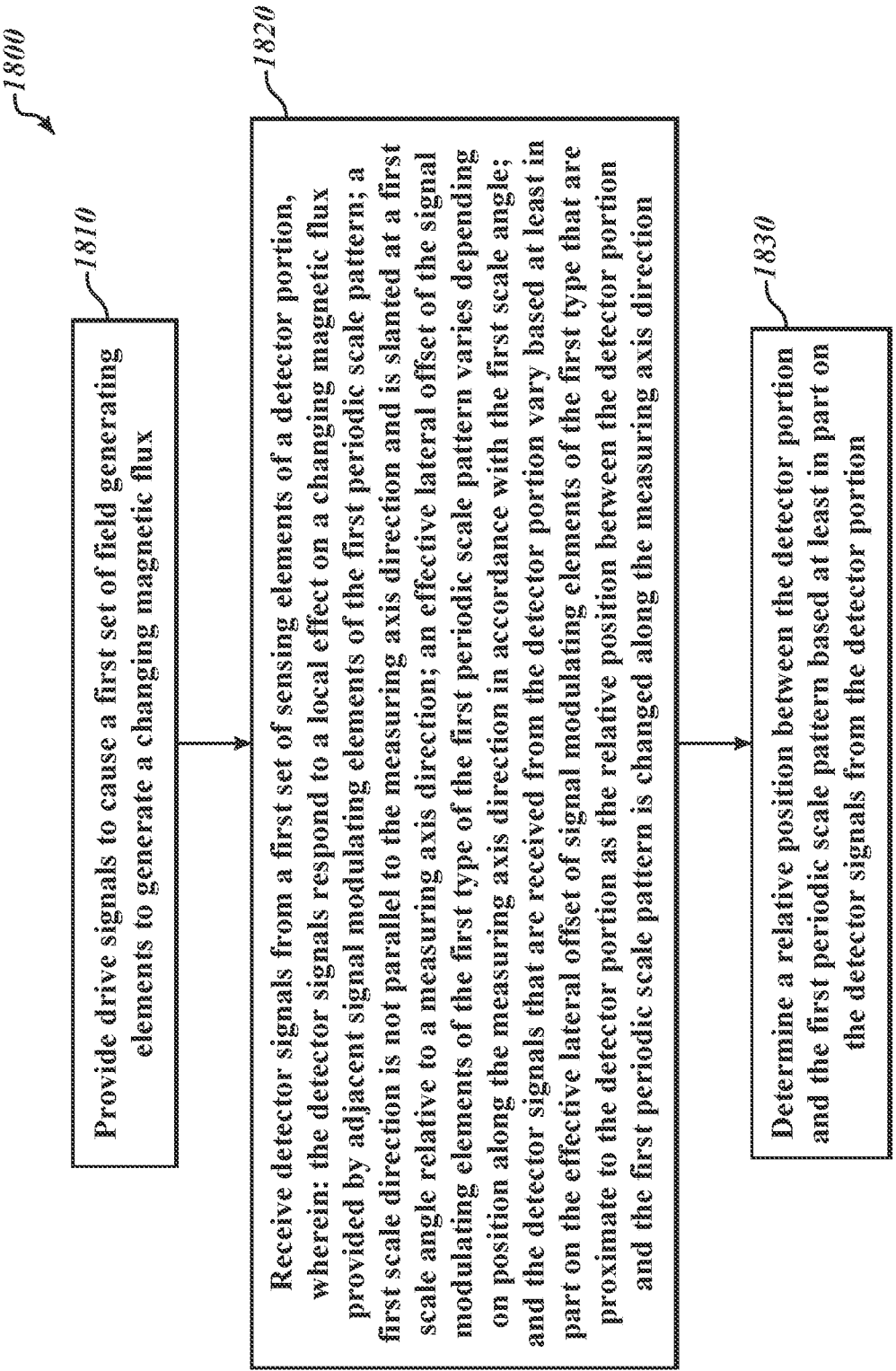
FIG. 18 is a flow diagram illustrating a method for operating a position encoder with a scale pattern that is slanted at a scale angle relative to a measuring axis direction.

FIG. 18 is a flow diagram illustrating a method 1800 for operating a position encoder with a scale pattern that is slanted at a scale angle relative to a measuring axis direction. Any of the transducers (TDR, TDR', TDR'") described above or modifications thereof may be used to configure the position encoder. In block 1810, a position encoder (101) provides drive signals to cause a first set of field generating elements (e.g., SET1FGE-A) to generate a changing magnetic flux.

In block 1820, the position encoder (101) receives detector signals from a first set of sensing elements (e.g., SET1SEN-A) of a detector portion (e.g., 167), wherein: the detector signals respond to a local effect on a changing magnetic flux provided by adjacent signal modulating elements (SME) of the first periodic scale pattern (e.g., 180); a first scale direction (e.g., Sal) is not parallel to a measuring axis direction (e.g., MA) and is slanted at a first scale angle (e.g., SA1 (=$\theta_{ABS1}$)) relative to the measuring axis direction (MA); and an effective lateral offset (ELO) of the signal modulating elements (SME) of the first type of the first periodic scale pattern (180) varies depending on position along the measuring axis direction (MA) in accordance with the first scale angle (SA1). The detector signals that are received from the detector portion (167) vary (e.g., and indicate an absolute position along at least a portion of the periodic scale pattern 180) based at least in part on the effective lateral offset (ELO) of signal modulating elements (SME) of the first type that are proximate to the detector portion (167) as the relative position between the detector portion (167) and the first periodic scale pattern (180) is changed along the measuring axis direction (MA). In block 1830, the position encoder (101) determines a relative position between the detector portion (167) and the first periodic scale pattern (180) based at least in part on the detector signals from the detector portion.

In relation to the operations at the blocks 1730 and 1830 for determining a relative position between the detector portion (167) and the first periodic scale pattern (180) based at least in part on the detector signals from the detector portion, various processing and/or signal combining techniques may be utilized (e.g., as will be understood by one skilled in the art and at least in part in accordance with the teachings in the incorporated references). Briefly, in various implementations two drive operations may be utilized for producing and processing the signals from the detector portion.

More specifically, as part of a first drive operation, field generating elements FGE-A may be driven (e.g., with corresponding drive signals from the signal processing configuration 166). In various examples as described herein, the field generating elements FGE-A may be part of or include sets of field generating elements (e.g., such as the first set of field generating elements SET1FGE-A of FIG. 4, or the first and second sets of field generating elements SET1FGE-A' and SET2FGE-A" of FIG. 12 or 16). As the field generating elements FGE-A are driven, corresponding signals from the sensing elements SEN-A and SEN-B of the detector portion may be read (e.g., received, processed, etc.) In various examples as described herein, the sensing elements SEN-A and SEN-B may be part of or include sets of sensing elements (e.g., such as the first set of sensing elements SET1SEN-A and the first set of offset sensing elements SET1SEN-B of FIG. 3, or the first set of sensing elements SET1SEN-A' and the first set of offset sensing elements SET1SEN-B' of FIG. 12 or 16).

As part of a second drive operation, the field generating elements FGE-B may be driven (e.g., with corresponding drive signals from the signal processing configuration 166). In various examples as described herein, the field generating elements FGE-B may be part of or include sets of field generating elements (e.g., such as the first set of offset field generating element SET1FGE-B of FIG. 4, or the first and second sets of offset field generating elements SET1FGE-B' and SET2FGE-B" of FIG. 12 or 16). As the field generating elements FGE-B are driven, corresponding signals from the sensing elements SEN-A and SEN-B of the detector portion may be read (e.g., received, processed, etc.) In various examples as described herein, the sensing elements SEN-A and SEN-B may be part of or include sets of sensing elements (e.g., such as the first set of sensing elements SET1SEN-A and the first set of offset sensing elements SET1SEN-B of FIG. 3, or the first set of sensing elements SET1SEN-A' and the first set of offset sensing elements SET1SEN-B' of FIG. 12 or 16).

In various implementations, for a given relative position between the detector portion and the periodic scale pattern (e.g., for which the lateral offsets LO of the signal modulating elements SME are different at different relative positions), a signal amplitude generated during the first drive operation (i.e., when the field generating elements FGE-A are driven) modulates differently than the corresponding signal amplitude generated during the second drive operation (i.e., when the field generating elements FGE-B are driven). In general, depending on the relative position, when there is a relative minimal signal resulting from the driving of the field generating elements FGE-A during the first drive operation, there may be a relative maximum signal resulting from the driving of the field generating elements FGE-B during the second drive operation, and vice versa.

The sensing signals (i.e., from the detector portion) produced during the first and second drive operations may be utilized to determine a relative position (e.g., an absolute position as corresponding at least in part to the unique relative lateral offsets of the signal modulating elements SME at the relative position) between the detector portion and the first periodic scale pattern. In various implementations, the sensing signals may include four signals that may be utilized for determining the relative position, such as the signal from the sensing elements SEN-A and the signal from the sensing elements SEN-B during the first drive operation, and the signal from the sensing elements SEN-A and the signal from the sensing elements SEN-B during the second drive operation.

It will be appreciated that the principles disclosed and claimed herein may be readily and desirably combined with various features disclosed in the incorporated references. The various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. An electronic position encoder configured to measure a relative position between a detector portion and a scale along a measuring axis direction, the electronic position encoder comprising:
   a scale extending along the measuring axis direction, the scale comprising a first periodic scale pattern including signal modulating elements comprising conductive plates or conductive loops that are disposed along a first scale direction and a first transverse scale direction;
   a detector portion configured to be mounted proximate to the first periodic scale pattern and to move relative to the first periodic scale pattern along the measuring axis direction over a full encoder range, the detector portion comprising:
a first set of field generating elements arranged along the first transverse scale direction, wherein members of the first set of field generating elements comprise conductive loops or conductive loop portions and are configured to generate a changing magnetic flux in response to a drive signal; and
a first set of sensing elements arranged along the measuring axis direction, wherein members of the first set of sensing elements comprise conductive loops or conductive loop portions, and the first set of sensing elements are configured to provide detector signals which respond to a local effect on a changing magnetic flux provided by adjacent signal modulating elements of the first periodic scale pattern; and
a signal processing configuration that is operably connected to the detector portion to provide the drive signals and that is configured to determine a relative position between the detector portion and the first periodic scale pattern based on detector signals input from the detector portion,
wherein:
the first scale direction is not parallel to the measuring axis direction and is slanted at a first scale angle relative to the measuring axis direction;
an effective lateral offset of the signal modulating elements of the first periodic scale pattern varies depending on position along the measuring axis direction in accordance with the first scale angle; and
the detector signals that are input from the detector portion vary based at least in part on the effective lateral offset of signal modulating elements that are proximate to the detector portion as the relative position between the detector portion and the first periodic scale pattern is changed along the measuring axis direction.

2. The electronic position encoder of claim 1, wherein:
the first set of field generating elements are disposed along the first transverse scale direction according to a first field generating element spatial wavelength; and
a total effective lateral offset of the first periodic scale pattern over the full encoder range is equal to at least 1/10 of the first field generating element spatial wavelength.

3. The electronic position encoder of claim 1, wherein:
the first set of field generating elements are disposed along the first transverse scale direction according to a first field generating element spatial wavelength; and
a total effective lateral offset of the first periodic scale pattern over the full encoder range is equal to at least 1/4 of the first field generating element spatial wavelength.

4. The electronic position encoder of claim 1, wherein:
the first set of field generating elements are disposed along the first transverse scale direction according to a first field generating element spatial wavelength; and
a total effective lateral offset of the first periodic scale pattern over the full encoder range is equal to at least 1/2 of the first field generating element spatial wavelength.

5. The electronic position encoder of claim 1, wherein the members of the first set of field generating elements comprising the conductive loops or conductive loop portions are slanted at the first scale angle relative to the measuring axis direction.

6. The electronic position encoder of claim 1, wherein the members of the first set of sensing elements comprising the conductive loops or conductive loop portions are nominally perpendicular relative to the measuring axis direction.

7. The electronic position encoder of claim 1, wherein the signal modulating elements comprise conductive plates with non-rectangular parallelogram surfaces which each comprise two edges which are parallel to the first scale direction and two edges which are perpendicular to the measuring axis direction.

8. The electronic position encoder of claim 1, wherein the first scale angle is at least 1 degree.

9. The electronic position encoder of claim 1, wherein the detector signals that are input from the detector portion indicate an absolute position along at least a portion of the scale pattern based at least in part on the effective lateral offset of signal modulating elements that are proximate to the detector portion.

10. The electronic position encoder of claim 1, wherein the detector portion further comprises:
a first set of offset field generating elements arranged along the first transverse scale direction, wherein members of the first set of offset field generating elements comprise conductive loops or conductive loop portions and are configured to generate a changing magnetic flux in response to a drive signal and the first set of offset field generating elements is offset relative to the first set of field generating elements by a field generating element spatial phase offset for which the first set of field generating elements corresponds to a first field generating element spatial phase and the first set of offset field generating elements corresponds to a first offset field generating element spatial phase; and
a first set of offset sensing elements arranged along the measuring axis direction, wherein members of the first set of offset sensing elements comprise conductive loops or conductive loop portions, and the first set of offset sensing elements are configured to provide detector signals which respond to a local effect on the changing magnetic flux provided by adjacent signal modulating elements of the first periodic scale pattern; and the first set of offset sensing elements is offset relative to the first set of sensing elements by a sensing element spatial phase offset for which the first set of sensing elements corresponds to a first sensing element spatial phase and the first set of offset sensing elements corresponds to a first offset sensing element spatial phase.

11. The electronic position encoder of claim 1, wherein:
the scale further comprises a second periodic scale pattern; and
the detector portion is configured to be mounted proximate to the first periodic scale pattern and the second periodic scale pattern and to move along the measuring axis direction relative to the first periodic scale pattern and the second periodic scale pattern over a full encoder range.

12. The electronic position encoder of claim 11, wherein:
the second periodic scale pattern includes signal modulation elements comprising conductive plates or conductive loops that are disposed along a second scale direction and a second transverse scale direction, wherein the second scale direction is nominally symmetric with the first scale direction about a central axis of the scale, for which the central axis is at least one of collinear or parallel with the measuring axis direction;

the second scale direction is not parallel to the measuring axis direction and is slanted at a second scale angle relative to the measuring axis direction;

an effective lateral offset of the signal modulation elements of the second periodic scale pattern varies depending on position along the measuring axis direction in accordance with the second scale angle; and the detector signals that are input from the detector portion vary based at least in part on the effective lateral offset of signal modulation elements that are proximate to the detector portion as the relative position between the detector portion and the first and second periodic scale patterns is changed along the measuring axis direction.

13. The electronic position encoder of claim 1, wherein:

the scale further comprises an unslanted periodic scale pattern including unslanted signal modulation elements comprising conductive plates or conductive loops that are disposed along the measuring axis direction and for which the unslanted periodic scale pattern is not slanted relative to the measuring axis direction; and the detector portion further comprises an unslanted field generating element portion that is disposed along the measuring axis direction and is not slanted relative to the measuring axis direction and is configured to generate a changing magnetic flux in response to a drive signal and to operate in conjunction with the unslanted periodic scale pattern.

14. A method for operating an electronic position encoder configured to measure a relative position between a detector portion and a scale along a measuring axis direction, the electronic position encoder comprising:

a scale extending along the measuring axis direction, the scale comprising a first periodic scale pattern including signal modulating elements comprising conductive plates or conductive loops that are disposed along a first scale direction and a first transverse scale direction;

a detector portion configured to be mounted proximate to the first periodic scale pattern and to move relative to the first periodic scale pattern along the measuring axis direction, the detector portion comprising:

a first set of field generating elements arranged along the first transverse scale direction, wherein members of the first set of field generating elements comprise conductive loops or conductive loop portions and are configured to generate a changing magnetic flux in response to a drive signal; and a first set of sensing elements arranged along the measuring axis direction, wherein members of the first set of sensing elements comprise conductive loops or conductive loop portions, and the first set of sensing elements are configured to provide detector signals, the method comprising:

providing drive signals to cause the first set of field generating elements to generate the changing magnetic flux;

receiving detector signals from the first set of sensing elements of the detector portion, wherein: the detector signals respond to a local effect on a changing magnetic flux provided by adjacent signal modulating elements of the first periodic scale pattern; the first scale direction is not parallel to the measuring axis direction and is slanted at a first scale angle relative to the measuring axis direction; an effective lateral offset of the signal modulating elements of the first periodic scale pattern varies depending on position along the measuring axis direction in accordance with the first scale angle; and the detector signals that are received from the detector portion vary based at least in part on the effective lateral offset of signal modulating elements that are proximate to the detector portion as the relative position between the detector portion and the first periodic scale pattern is changed along the measuring axis direction; and determining a relative position between the detector portion and the first periodic scale pattern based at least in part on the detector signals from the detector portion.

15. The method of claim 14, wherein:

the first set of field generating elements are disposed along the first transverse scale direction according to a first field generating element spatial wavelength; and a total effective lateral offset of the first periodic scale pattern over the full encoder range is equal to at least $\frac{1}{10}$ of the first field generating element spatial wavelength.

16. The method of claim 14, wherein the members of the first set of field generating elements comprising the conductive loops or conductive loop portions are slanted at the first scale angle relative to the measuring axis direction.

17. The method of claim 14, wherein the signal modulating elements comprise conductive plates with non-rectangular parallelogram surfaces which each comprise two edges which are parallel to the first scale direction and two edges which are perpendicular to the measuring axis direction.

18. The method of claim 14, wherein the first scale angle is at least 1 degree.

19. The method of claim 14, wherein the detector signals that are input from the detector portion indicate an absolute position along at least a portion of the scale pattern based at least in part on the effective lateral offset of signal modulating elements that are proximate to the detector portion.

20. A system configured to measure a relative position between a detector portion and a scale along a measuring axis direction, the system comprising:

a scale extending along the measuring axis direction, the scale comprising a first periodic scale pattern including signal modulating elements comprising conductive plates or conductive loops that are disposed along a first scale direction and a first transverse scale direction;

a detector portion configured to be mounted proximate to the first periodic scale pattern and to move relative to the first periodic scale pattern along the measuring axis direction, the detector portion comprising:

a first set of field generating elements arranged along the first transverse scale direction, wherein members of the first set of field generating elements comprise conductive loops or conductive loop portions and are configured to generate a changing magnetic flux in response to a drive signal; and a first set of sensing elements arranged along the measuring axis direction, wherein members of the first set of sensing elements comprise conductive loops or conductive loop portions, and the first set of sensing elements are configured to provide detector signals, wherein:

the first scale direction is not parallel to the measuring axis direction and is slanted at a first scale angle relative to the measuring axis direction;

an effective lateral offset of the signal modulating elements of the first periodic scale pattern varies depending on position along the measuring axis direction in accordance with the first scale angle;

the detector signals that are input from the detector portion vary based at least in part on the effective lateral offset of signal modulating elements that are proximate to the detector portion as the relative position between the detector portion and the first periodic scale pattern is changed along the measuring axis direction; and the system is configured to:
provide drive signals to cause the first set of field generating elements to generate the changing magnetic flux; and receive detector signals from the first set of sensing elements, wherein the detector signals respond to a local effect on a changing magnetic flux provided by adjacent signal modulating elements of the first periodic scale pattern.

* * * * *